(12) United States Patent
Pettitt et al.

(10) Patent No.: US 11,320,728 B2
(45) Date of Patent: May 3, 2022

(54) SPATIAL LIGHT MODULATOR IMAGE DISPLAY PROJECTOR APPARATUS WITH SOLID STATE ILLUMINATION LIGHT SOURCES

(71) Applicant: TEXAS INSTRUMENTS INCORPORATED, Dallas, TX (US)

(72) Inventors: Gregory S. Pettitt, Sherman, TX (US); Michael Terry Davis, Richardson, TX (US); James Francis Hallas, Allen, TX (US); John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/959,141

(22) Filed: Apr. 20, 2018

(65) Prior Publication Data

US 2018/0239230 A1     Aug. 23, 2018

Related U.S. Application Data

(63) Continuation-in-part of application No. 15/913,690, filed on Mar. 6, 2018, which is a continuation of
(Continued)

(51) Int. Cl.
*G03B 21/20* (2006.01)
*G03B 33/12* (2006.01)
(Continued)

(52) U.S. Cl.
CPC ......... *G03B 21/204* (2013.01); *G03B 21/005* (2013.01); *G03B 33/06* (2013.01);
(Continued)

(58) Field of Classification Search
CPC .... G03B 21/204; G03B 21/208; G03B 33/06; G03B 33/12; H04N 9/3158; H04N 9/3161
(Continued)

(56) References Cited

U.S. PATENT DOCUMENTS 4,262,021 A   4/1981 Kraska
5,612,753 A   3/1997 Pradish et al.
(Continued)

FOREIGN PATENT DOCUMENTS

CN   106154713 A   11/2016
CN   106523955 A    3/2017
(Continued)

OTHER PUBLICATIONS

Machine Translation of WO 2018073893 (Year: 2019).*
(Continued)

*Primary Examiner* — Jerry L Brooks
(74) *Attorney, Agent, or Firm* — Michelle F. Murray; Charles A. Brill; Frank D. Cimino

(57) ABSTRACT

In described examples, a projector includes a light source to produce first light of a first color. The projector also includes a phosphor to selectively receive the first light and produce second light of a second color in response to the first light. The projector also includes a dichroic mirror to pass a portion of the second light to produce a third light of a third color. The dichroic mirror reflects a portion of the second light as fourth light of a fourth color.

29 Claims, 17 Drawing Sheets

Related U.S. Application Data application No. 15/606,925, filed on May 26, 2017, now Pat. No. 9,939,719, which is a continuation of application No. 14/286,326, filed on May 23, 2014, now Pat. No. 9,664,989.

(60) Provisional application No. 61/826,871, filed on May 23, 2013, provisional application No. 62/487,905, filed on Apr. 20, 2017, provisional application No. 62/558,981, filed on Sep. 15, 2017.

(51) Int. Cl.
*G03B 33/06* (2006.01)
*G03B 21/00* (2006.01)
*H04N 9/31* (2006.01)

(52) U.S. Cl.
CPC .......... *G03B 33/12* (2013.01); *H04N 9/3105* (2013.01); *H04N 9/3114* (2013.01); *H04N 9/3158* (2013.01); *H04N 9/3161* (2013.01); *G03B 21/208* (2013.01)

(58) Field of Classification Search
USPC ............................................................ 353/31
See application file for complete search history.

(56) References Cited

U.S. PATENT DOCUMENTS

| | | | |
|---|---|---|---|
| 6,349,006 B1* | 2/2002 | Okamori | G02B 5/04 348/E5.142 |
| 9,195,123 B2 | 11/2015 | Pettitt et al. | |
| 9,509,966 B2 | 11/2016 | Saitou et al. | |
| 9,664,892 B2 | 5/2017 | King et al. | |
| 9,664,989 B2 | 5/2017 | Bommerbach et al. | |
| 9,939,719 B2 | 4/2018 | Bommerbach et al. | |
| 10,312,019 B2 | 6/2019 | Zlatkov | |
| 2010/0019359 A1 | 1/2010 | Pagaila et al. | |
| 2010/0301474 A1 | 12/2010 | Yang | |
| 2011/0211333 A1 | 9/2011 | Bartlett | |
| 2012/0229780 A1* | 9/2012 | Sato | G02B 5/0263 353/85 |
| 2013/0194644 A1 | 8/2013 | Cable et al. | |
| 2013/0242534 A1 | 9/2013 | Pettitt et al. | |
| 2014/0340650 A1* | 11/2014 | Davis | H04N 9/3105 353/33 |
| 2014/0347634 A1 | 11/2014 | Bomerbach et al. | |
| 2015/0377430 A1* | 12/2015 | Bhakta | F21S 41/176 362/84 |
| 2017/0075203 A1* | 3/2017 | Cheng | G03B 21/208 |
| 2018/0170050 A1 | 6/2018 | Chen et al. | |
| 2018/0226367 A1 | 8/2018 | Babcock et al. | |
| 2018/0259839 A1* | 9/2018 | Okuda | G03B 33/12 |
| 2020/0186762 A1* | 6/2020 | Takahashi | H04N 9/312 |
| 2020/0258830 A1 | 8/2020 | Palm | |

FOREIGN PATENT DOCUMENTS

| | | | | |
|---|---|---|---|---|
| WO | | 2014102976 A1 | 7/2014 | |
| WO | WO 2018073893 | * | 10/2016 | ............. G03B 21/14 |

OTHER PUBLICATIONS

International Search Report for PCT/US2018/028706 dated Dec. 6, 2018.

Denault, "Efficient and Stable Laser-driven White Lighting," AIP Advances 3, 072107 (2013) 2158-3226/2013/3(7)/072107/6, http://aip.scitation.org/doi/10.1063/1.4813837 American Institute of Physics, One Physics Ellipse, College Park, MD 20740, USA.

First Office Action dated May 21, 2021, Chinese Application No. 201880032646.4, 20 pages.

* cited by examiner

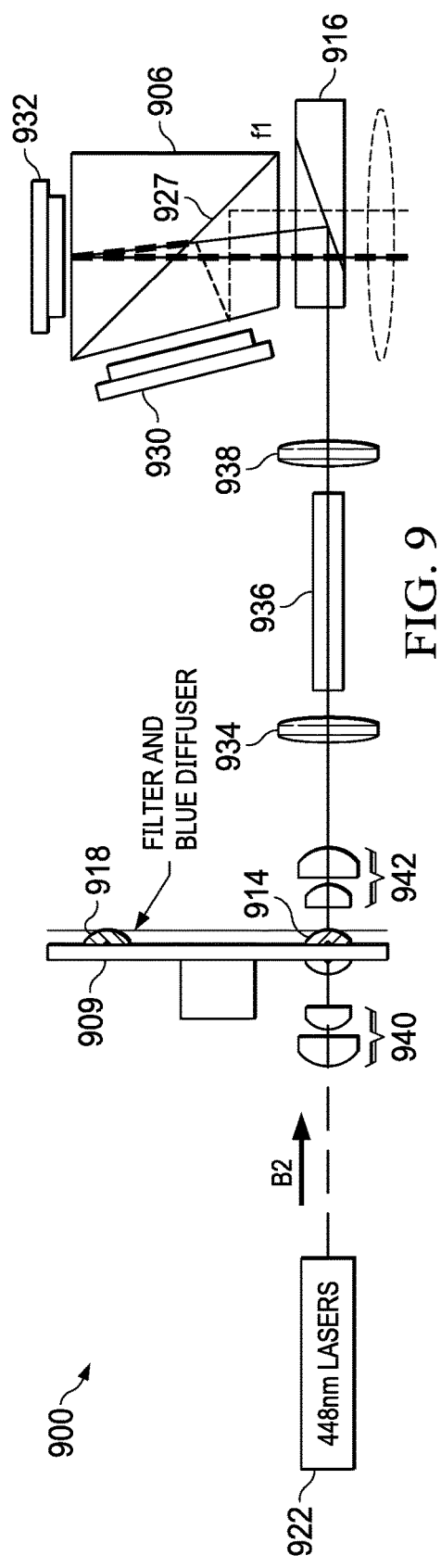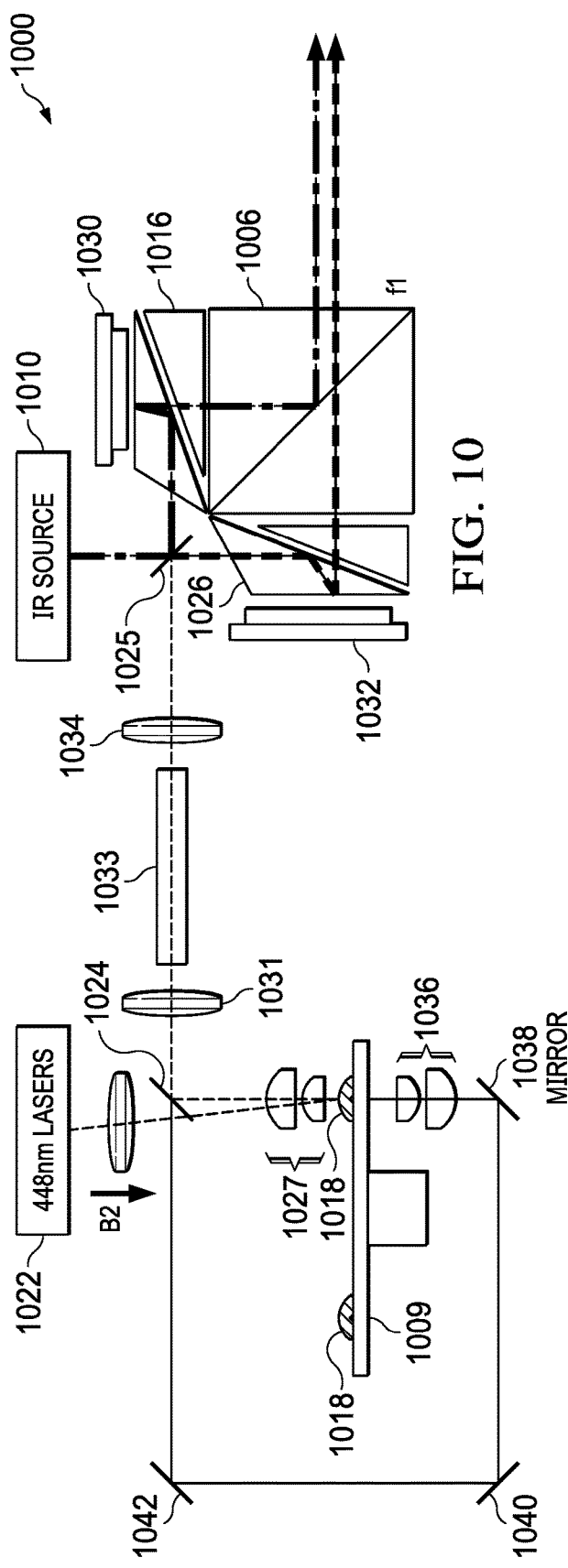

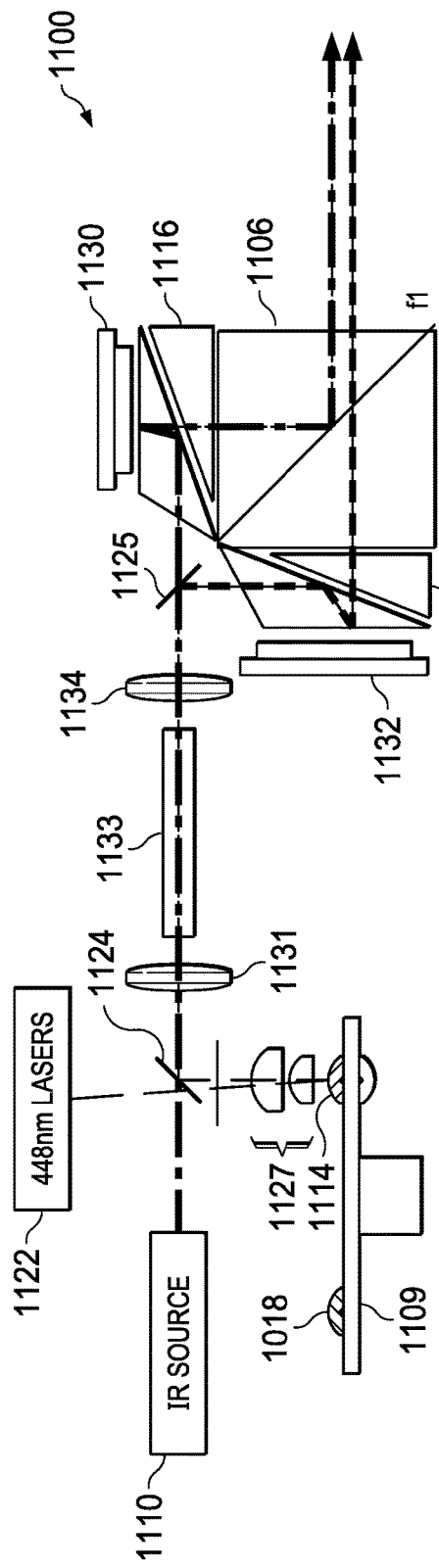
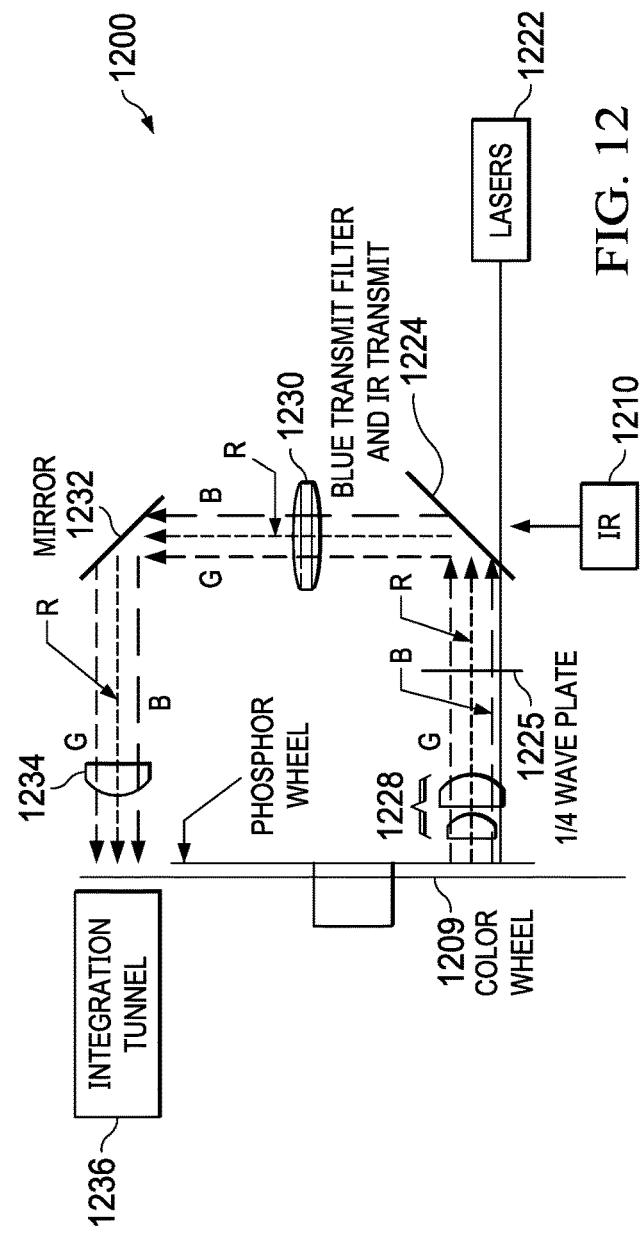
FIG. 11
FIG. 12

SPATIAL LIGHT MODULATOR IMAGE DISPLAY PROJECTOR APPARATUS WITH SOLID STATE ILLUMINATION LIGHT SOURCES

CROSS-REFERENCE TO RELATED APPLICATIONS

This application is a continuation-in-part of co-owned co-pending U.S. patent application Ser. No. 15/913,690 filed Mar. 6, 2018, which is a continuation of U.S. patent application Ser. No. 15/606,925 filed May 26, 2017 (issued as U.S. Pat. No. 9,939,719 on Apr. 10, 2018), which is a continuation of U.S. patent application Ser. No. 14/286,326 filed May 23, 2014 (issued as U.S. Pat. No. 9,664,989 on May 30, 2017), which claims the benefit of priority under 35 U.S.C. § 119(e) to U.S. Provisional Patent Application Ser. No. 61/826,871 filed May 23, 2013.

Also, this application claims the benefit of priority under 35 U.S.C. § 119(e) to co-owned copending U.S. Provisional Patent Application Ser. No. 62/487,905 filed Apr. 20, 2017 and U.S. Provisional Patent Application Ser. No. 62/558,981 filed Sep. 15, 2017.

All of the above-identified applications are incorporated herein by reference.

TECHNICAL FIELD

This relates generally to image display projector apparatus and methods, and more particularly to spatial light modulator (SLM) image display projection with solid state illumination (SSI) light sources.

BACKGROUND

An example SLM projector is described in U.S. Pat. No. 9,195,123 granted Nov. 24, 2015, which is incorporated herein by reference. This example system uses a blue laser as a direct source of blue color light and as an indirect source of other color light by energizing phosphors with the blue color light from the blue laser.

Other arrangements for generating color sequences using relative movement of a color wheel and input light beam are also possible. U.S. Pat. No. 8,496,352 granted Jul. 30, 2013, which is incorporated herein by reference, describes an example color wheel having concentric annular tracks or rings of the respective color emitting phosphors at different radially spaced locations.

In some projectors with Texas Instruments' DLP® digital micromirror devices (DMDs), red, green and blue light are combined in an optical path.

SUMMARY

In described examples, a projector includes a light source to produce first light of a first color. The projector also includes a phosphor to selectively receive the first light and produce second light of a second color in response to the first light. The projector also includes a dichroic mirror to pass a portion of the second light to produce a third light of a third color. The dichroic mirror reflects a portion of the second light as fourth light of a fourth color.

BRIEF DESCRIPTION OF THE DRAWINGS

FIG. 9 illustrates a modification of the example architecture of FIG. 8.

FIG. 10 illustrates an example arrangement having an infrared (IR) light source.

FIG. 11 illustrates another example arrangement having an IR light source.

FIG. 12 illustrates another example arrangement having an IR light source.

DETAILED DESCRIPTION

Figure 1A:
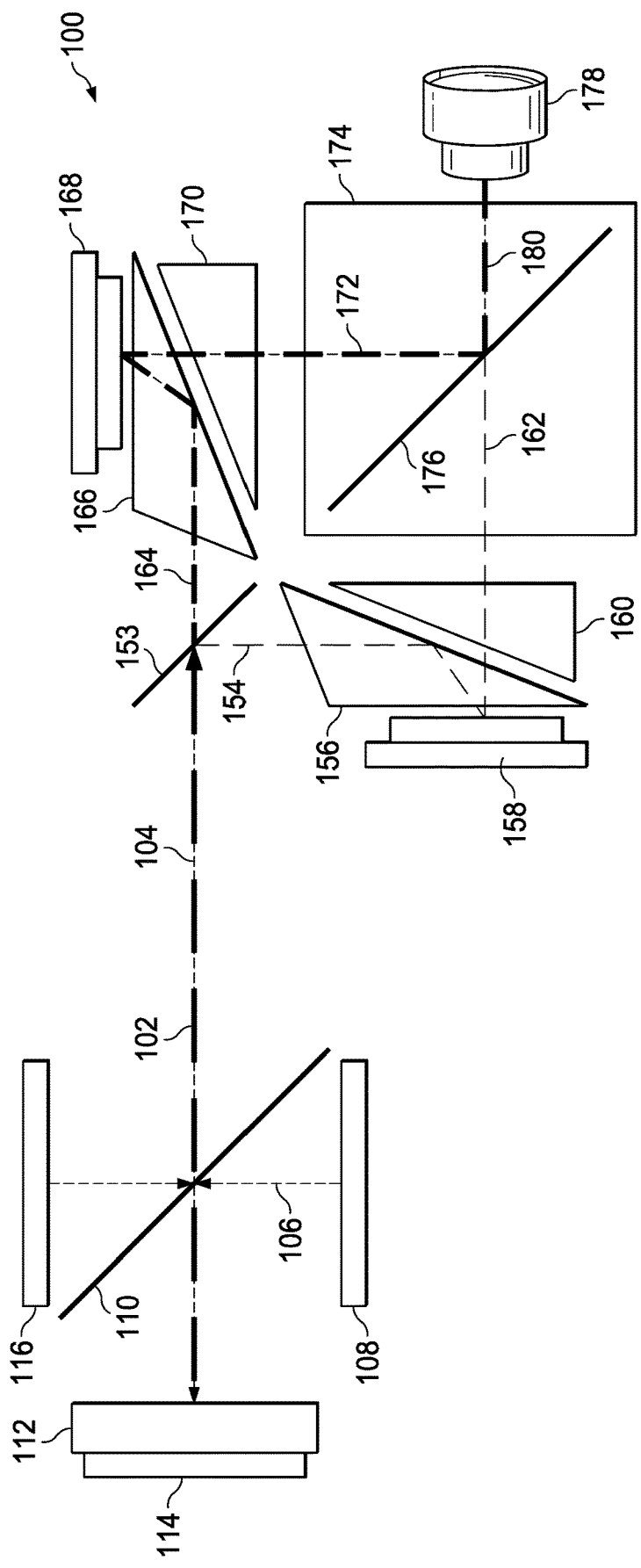
FIGS. 1A and 1B (collectively "FIG. 1") show an example projection system and example light sources.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled."

Example projector arrangements incorporate a spatial light modulator (SLM), such as a Texas Instruments DLP® digital micromirror device (DMD), whose mirrors are individually set using pulse-width modulation (PWM) intensity grayscaling with settings synchronized to respective time segments for illumination of the mirrors by respective sequentially generated colors. A "two-chip" architecture has two DMDs. Accordingly, the two-chip architecture directs light onto both DMDs, so one color of light is modulated by a first DMD, and two other colors of light are modulated by a second DMD. The two-chip architecture achieves high efficiency using light emitting laser diodes, laser/phosphor and laser architectures. Example two-chip architectures are described hereinbelow. Other examples described herein use only high output yellow and blue laser diodes with one filter for both combining and top side pumping.

Figure 1B:
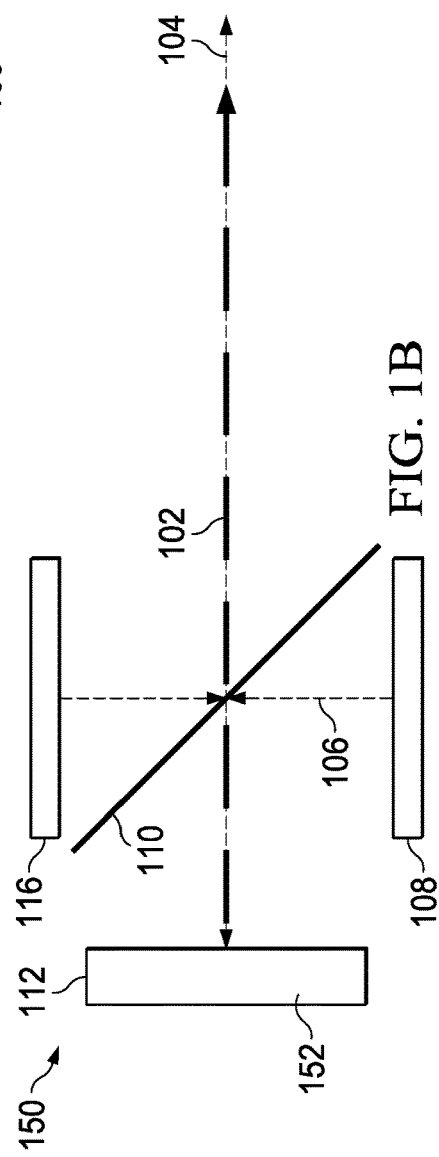

FIGS. 1A and 1B (collectively "FIG. 1") show an example projection system 100 and example light sources.

FIG. 1A shows an example light source using blue laser(s) and a yellow phosphor. An example yellow phosphor is described in Denault, et al., "Efficient and Stable Laser-driven White Lighting," AIP Advances 3, 072107 (2013), which is incorporated by reference herein. The use of a yellow source achieves many benefits, including: (a) high efficiency phosphor conversion, such as used in white lighting sources; (b) blue laser diode backlight, for increased efficiency; (c) ability to use top side pumping to increase light output; (d) use of only three laser diodes, which is the is the same number as in a red, green and blue (RGB) implementation, so costs are not increased over an RGB implementation; and (e) various options for implementation, such as rotating wheel implementations that use mixtures of yellow and/or green phosphors. In the example arrangements of FIGS. 1A and 1B, the phosphor is stationary, instead of being mounted on a wheel.

Laser diode vendors have developed white laser diodes for use in automotive, stage lighting and general illumination. These laser diodes convert blue wavelength sources to yellow light using the blue light to stimulate a yellow phosphor. The remaining blue light is added to the light emitted by the yellow phosphor to make a white light source. The laser diode can be adapted to produce only yellow light by changing the phosphor parameters. This yellow laser diode can be used by the two-chip architecture to improve brightness.

As further described hereinbelow, yellow light 102 and blue light 104 of the light source are used to create sequential color drive for the two-chip architecture. In the example of FIG. 1A, blue light 106 from laser diode 108 reflects off long wavelength pass filter 110 and impacts phosphor 112. Phosphor 112 converts the light to broad spectrum yellow light 102, as further described hereinbelow. Blue laser diode 114 also stimulates phosphor 112. Lenses (not shown) focus the yellow light 102 that passes through long wavelength pass filter 110, where it alternates with blue light 104 from laser diode 116. The two-chip architectures described hereinbelow split the yellow light 102 into component red and green light components. A yellow phosphor has a spectrum chosen to (when divided) generate desired green and red colors, or any other desired color gamut. Adding notch filters to the filter stacks can create wider gamuts. The laser diode 108 pumps the top side of the phosphor 112 to increase its light output. This can provide an additional 10% to 20% of light output from the yellow phosphor.

Blue light 104 passes through dichroic mirror 153 as light 164. Dichroic mirror 153 reflects green light, in this example. In other examples, dichroic mirror 153 may reflect blue light 104 while passing red light. When blue light 104 is provided from (e.g., generated by) laser diode 116, light 164 is blue and passes through prism 166 to illuminate the spatial light modulator 168. Modulated light 172 passes through prism 170 to combiner 174, which includes dichroic layer 176. In this example, dichroic layer 176 reflects red and blue light and passes green light. Light 172 reflects off dichroic layer 176 as light 180 to projection optics 178.

Yellow light 102 is split by dichroic mirror 153. The red component of yellow light 102 passes through dichroic mirror 153 and follows the path described hereinabove for blue light 104. The green portion of yellow light 102 is reflected by dichroic mirror 153 as light 154. Light 154 passes through prism 156 to illuminate spatial light modulator 158. Modulated light 162 passes through prism 160 and dichroic layer 176 and combines with light 172 to provide light 180. Accordingly, in light 180, red light is modulated by spatial light modulator 168, and green light is modulated by spatial light modulator 158. Light 180 passes to projection optics 178. Thus, by alternately providing yellow light 102 and blue light 104 to the two-chip architecture using SLMs 158, 168, and by dividing yellow light 102 into red and green components using dichroic mirror 153, the light source provides the red, green and blue light for driving the two-chip system. FIG. 1B shows an alternative example light source 150 with a yellow phosphor 152 with a top side pump provided (e.g., generated) by laser diode 108. With light source 150, yellow light 102 is provided by activating laser diode 108, and blue light 104 is provided by activating laser diode 116.

Figure 2A:
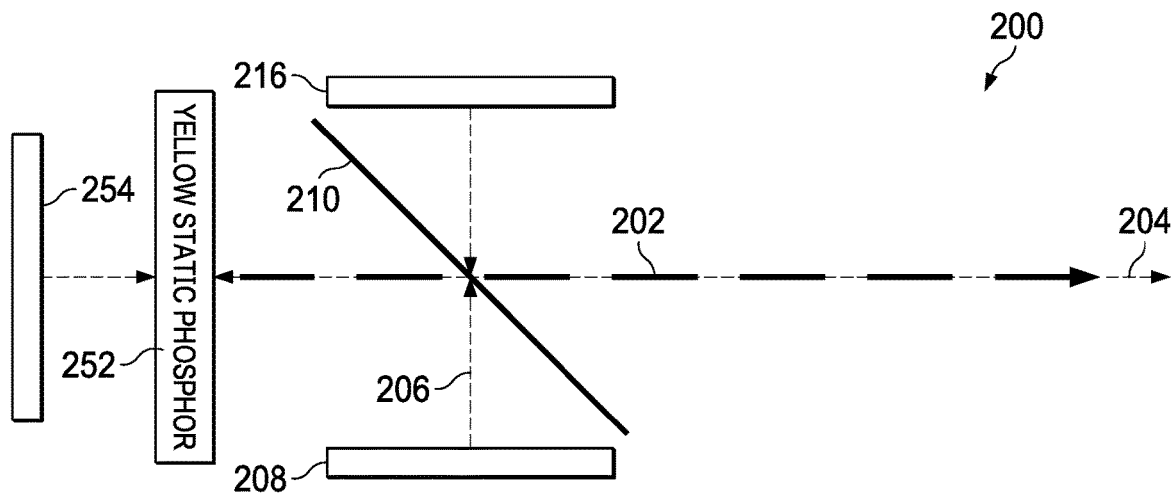
FIGS. 2A and 2B (collectively "FIG. 2") show other example light sources.
Figure 2B:
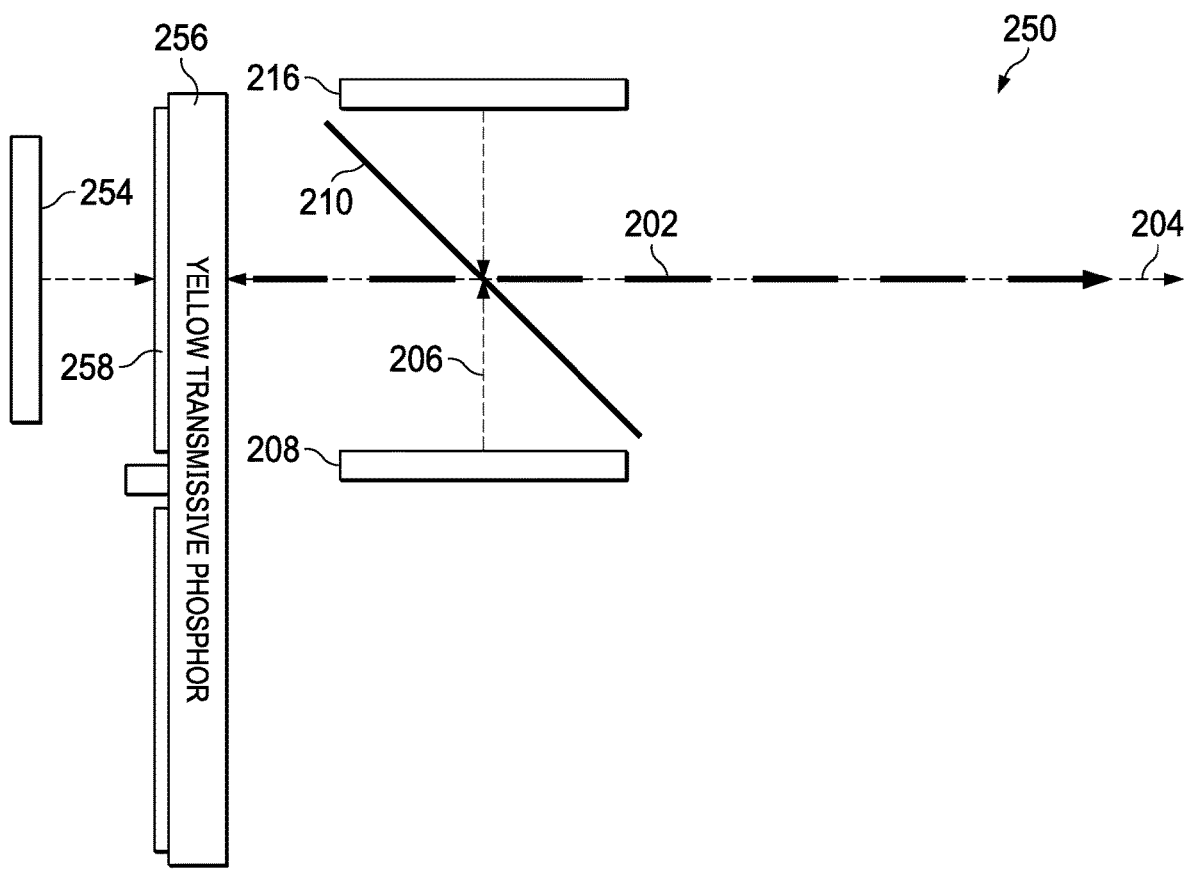

FIGS. 2A and 2B (collectively "FIG. 2") show other example light sources. Where reference numbers of elements in FIG. 2 correspond to reference numbers of elements in FIG. 1, those elements in FIG. 2 perform functions similar to the corresponding elements in FIG. 1. For example, yellow light 202, blue light 204, blue light 206, laser diode 208, long wavelength pass filter 210 and laser diode 216 in FIG. 2 correspond to yellow light 102, blue light 104, blue light 106, laser diode 108, long wavelength pass filter 110 and laser diode 116 in FIG. 1, respectively. FIG. 2A shows an example light source 200 having a stationary yellow static phosphor 252 with bottom and top side pumps. Laser diode 208 provides top side light, and laser diode 254 provides remote bottom side light. Yellow light is provided by activating laser diodes 208 and 254. Blue light is provided by activating laser diode 216.

FIG. 2B shows an example light source 250 having a transmissive phosphor wheel 256 with a bottom (as oriented in FIG. 2B) laser diode 254 side pump and a top (as oriented in FIG. 2B) laser diode 208 side pump. Short wavelength pass filter 258 is mounted to the back side of phosphor wheel 256. Short wavelength pass filter 258 allows the light from laser diode 254 to pass to phosphor wheel 256, but reflects the yellow light produced by the interaction of the light from laser diode 254 (and laser diode 208). Yellow light is provided by activating laser diodes 208 and 254. Blue light is provided by activating laser diode 216. In at least one example, a green (or combination of green and yellow) phosphor can be used in the transmissive phosphor wheel. The illumination from the examples of FIGS. 1 and 2 illuminates a two-chip architecture, such as the two-chip architectures shown in FIG. 1A and FIGS. 3-21 as described hereinbelow.

Several DMD SLM example imaging system designs herein use laser diode and laser/phosphor light source illumination. The laser/phosphor light source provides certain efficiency advantages over traditional light source based systems. The laser spot size on the phosphor can also be decreased to best match the etendue of the DMD in the system. However, in laser/phosphor based systems, it may be necessary to filter the phosphor emitted colors to achieve desired color points. An example of such filtering is the use of a yellow color emitting phosphor and filtering the phosphor emitted yellow to achieve a desired red color. Another example is filtering a green color phosphor emission to achieve a desired green color point. In each of those examples, the full spectrum of light (generated by the phosphor) is filtered to remove an unnecessary part of the spectrum.

The number of lasers that illuminate the phosphor is related to the projector's lumen output. The additional lasers result in higher lumens, but at the cost of additional power. The use of additional lasers may also cause the phosphor to have reduced light generating efficacy (e.g., lumens per input watt), and the added number of lasers increases the cost of the system. Multi-chip system architectures may reduce or eliminate some issues encountered with using laser/phosphor based light sources in a single-chip architecture. An example of a full-color projection display system using two DMD light modulators is described in U.S. Pat. No. 5,612,753 ("the '753 patent"), which is incorporated herein by reference.

Figure 3:
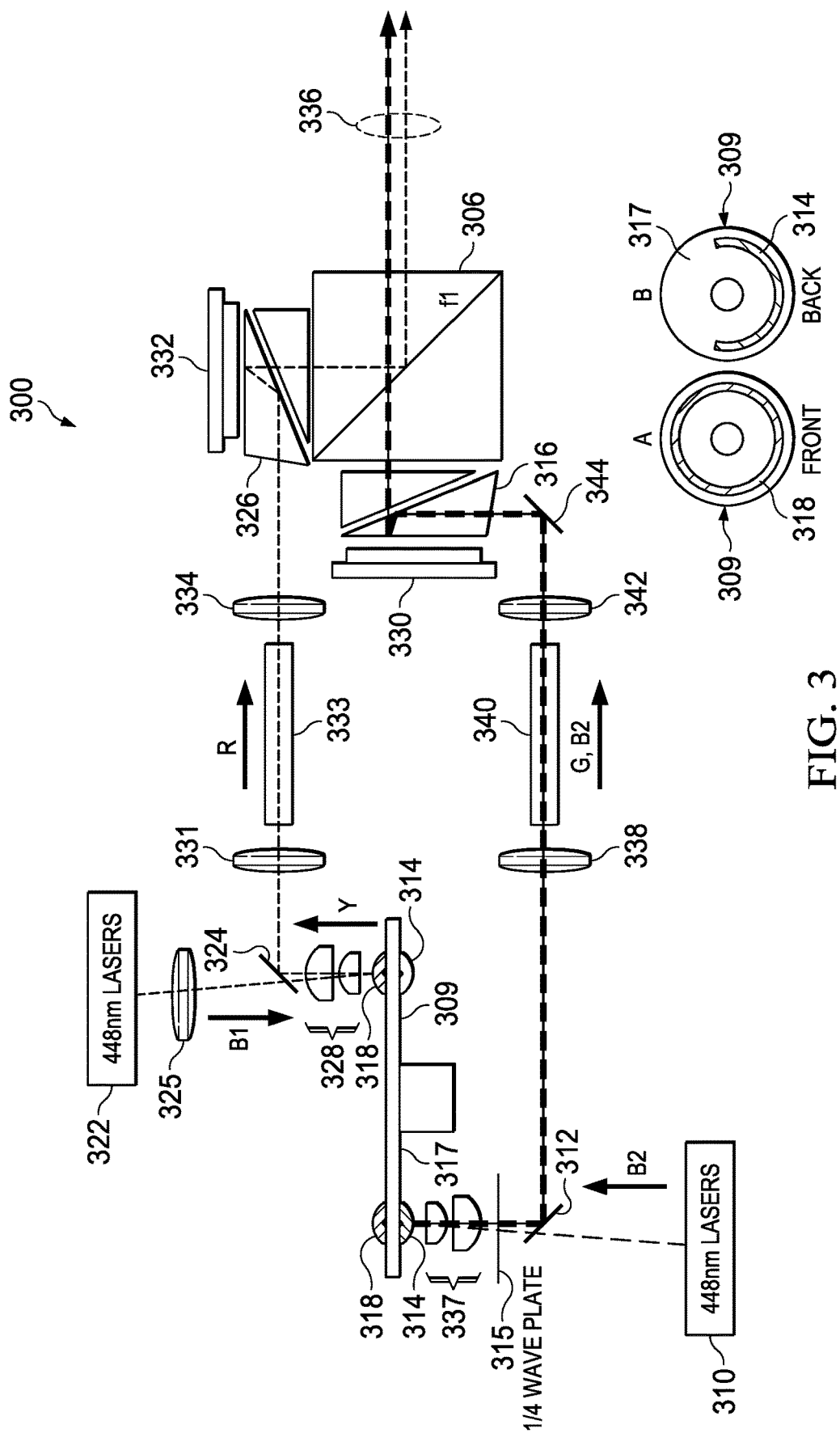
FIG. 3 illustrates an example architecture.

FIG. 3 of the '753 patent illustrates a two-modulator projector that uses a white light illumination source in which white light (such as from a metal halide arc lamp) passes through color filter segments of a rotating color wheel. The respective sequential color light emitted by the color wheel is relayed through a color splitting prism that passes: a dominant first color to a first DMD modulator; and other second colors to a second DMD modulator. The color combining prism cooperates with a total internal reflection prism (TIR prism) to recombine the reflected separate DMD modulated light for imaging by a single projection lens. In this system, the color wheel always passes one of the primary colors, and alternates between the other two. The first DMD then handles modulation of the red (dominant color), and the second DMD handles time sequential modulation of green and blue (the other colors).

FIGS. 3 through 13 illustrate examples of illumination in architectures having two digital micromirror (DMD) chips using laser light sources and phosphor emissions instead of a white light source, and using a two-prism cube for combining the separately modulated colors. U.S. Patent Application Publication No. 2014/0347634, published Nov. 27, 2014, which is incorporated herein by reference, discloses projector architectures having phosphors and laser light sources to illuminate two-chip and three-chip SLM architectures.

FIG. 3 illustrates an example architecture 300. Blue laser light B1 from a first light source 322 transmits through lens 325, a first angled filter 324 and lenses 328 onto the front of a phosphor wheel 309, which has a circular segment coated with a yellow emitting phosphor 318 (see view A in FIG. 3). For example, the light sources may be laser diode light sources. The yellow segment is continuous, which exposes the incident laser light for the full rotation of the wheel 309, which rotates by at least one revolution per frame. The yellow light Y emits back through lenses 328 to the first angled filter 324, which reflects at least the red component R as the dominant color through lens 331, light tunnel 333 and lens 334 to a first total internal reflection prism (TIR prism) optical element 326 that provides the light R to the first DMD 332 for modulation. Blue laser light B2 from a second blue laser light source 310 transmits through an angled polarization filter 312, a one-quarter wave plate (QWP) 315 and lenses 337 onto the back side of the phosphor wheel 309. The back side of the wheel 309 has a slightly more than 180° segment coated with a green light emitting phosphor 314 (see view B in FIG. 3), which emits green light G in response to the blue incident laser light B2 for slightly more than 50% of the frame, and reflects the blue incident light B2 off a reflective (such as aluminum) reflector 317 for the remainder of the frame time. The sequentially emitted green and blue colors travel back through the one-quarter wave plate 315 and to the angled polarization filter 312, which reflects the polarization-shifted blue and green light through lens 338, light tunnel 340, lens 342 and mirror 344 to a second TIR prism optical element 316, which provides the green and blue light to the second DMD 330 for common time sequential modulation. The two-prism cube combiner 306 combines the modulated dominant (R) and other color (G and B2) light into a modulated composite beam 336 for projection of a formed image onto a target surface. The relative arcuate extent of the green phosphor segment 314 and the laser ON/OFF times may be chosen to vary the respective color modulation times to set a desired color (white) point.

Figure 4:
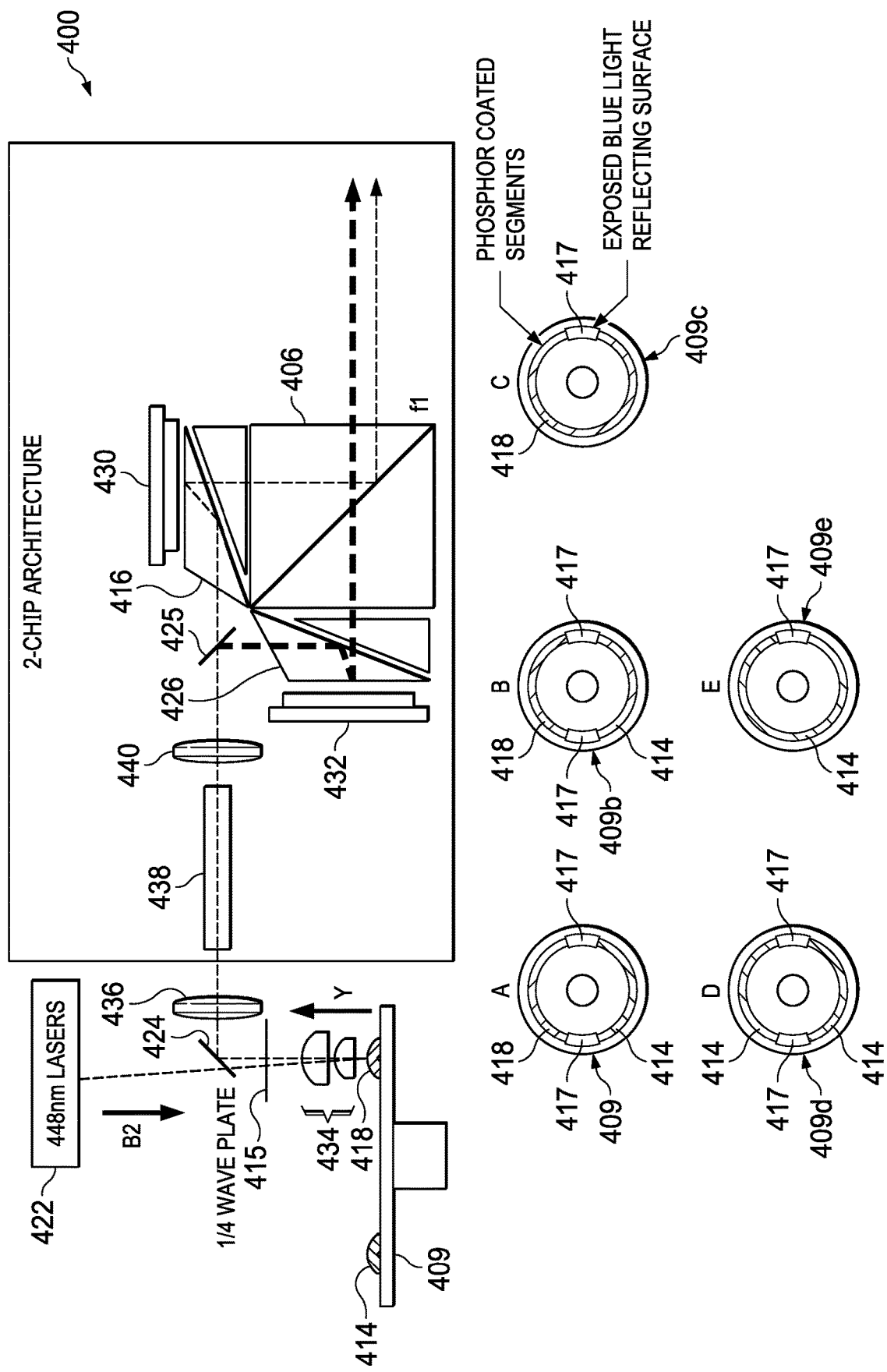
FIG. 4 illustrates an example two-chip architecture.

FIG. 4 illustrates an example two-chip architecture 400 having a single laser light source 422 and a single-color phosphor wheel 409. The single-color phosphor wheel 409 has a circular arrangement of an arcuate segment of yellow phosphor 418, an arcuate segment of green emitting phosphor 414 and an arcuate segment of blue reflecting surface 417 (view A in FIG. 4). Each of these arcuate segments may have different lengths. In this example, because red and green combine for yellow, the yellow or green emitting phosphor segments emit green for the time that the blue laser light B2 is incident on either the yellow or green emitting phosphor segments, and the yellow phosphor segment emits red for the time that the laser light is incident on the yellow phosphor segment. The blue laser light B2 is directed onto the phosphor wheel 409 (by transmission through a first angled polarization filter 424, a one-quarter wave plate 415 and lenses 434) and is directed to one spatial light modulator. Red/green or green color (emitted by excitement of the corresponding yellow phosphor 418 or green phosphor segment 414) passes back through lenses 434 and the one-quarter wave plate 415 and is reflected off the first angled polarization filter 424 through lens 436, light tunnel 438 and lens 440. The red light is transmitted through a second filter 425 to a first TIR prism 416 and first DMD 430 for individual modulation. Second filter 425 reflects the green light to a second TIR prism 426 and second DMD 432. First and second filters 424, 425 reflect phase-shifted blue light (reflected off the reflecting surface 417 of the wheel 409) to the second TIR prism 426 for time sequential modulation with the green light by the second DMD 432. The two-prism cube combiner 406 combines the time sequentially modulated colors for projection of the image for eye integration of the continuous red and time-sequential green/blue modulations during the frame display time at a display screen (not shown).

Views B-E of FIG. 4 illustrate some of the many other segment configurations (labeled 409b-e respectively) that may be used for the phosphor wheel 409 in the arrangement of FIG. 4. Views B and C show wheels 409b and 409c, which have yellow phosphor 418 arranged in a circular ring band on a reflective surface of the wheel. The yellow phosphor 418 segment in View B occupies the positions of both the yellow phosphor 418 and green phosphor segment 414 in View A, and has a continuous ring shape interrupted by two approximately 30° arcuate segments of blue laser light reflecting surface 417 at diametrically opposite places on the ring. View C is similar to View B, except that only one blue light reflection surface 417 interrupts the yellow phosphor 418. Neither of the View B or View C configurations has a green segment. For example, the phosphor composition of the yellow segments may provide an emission spectrum like that illustrated in FIG. 5A, where the yellow phosphor emits both red and green light when energized by the incident blue laser light. The dichroic filter 425 is suitably chosen to filter the emitted light for directing the desired red and green components R, G to the respective separate first and second DMDs 430, 432 for modulation.

Views D and E of FIG. 4 show wheels 409d and 409e, which have green light emitting phosphor 414 segments arranged in circular ring bands like those shown for the yellow phosphor 418 segments in Views B and C. As described hereinabove, one or more arcuate segments of the blue light reflecting surface 417 similarly interrupt the green phosphor segment rings. The View D and E wheels do not have a yellow phosphor segment. The phosphor composition of the green segments is chosen to provide both red and green emissions, such as the example emission spectrum illustrated in FIG. 5B. Dichroic filter 425 may filter the emitted light to isolate and direct the desired red and green components R, G for modulation by the respective separate first and second DMDs 430, 432. The different heights of the responses for the yellow and green phosphors 418, 414 (indicated by the spectra shown in FIGS. 5A, 5B) may be balanced by applying different attenuations (by adjusting the ON/OFF timing of the mirrors) at the respective first and second DMDs 430, 432.

Figure 5A:
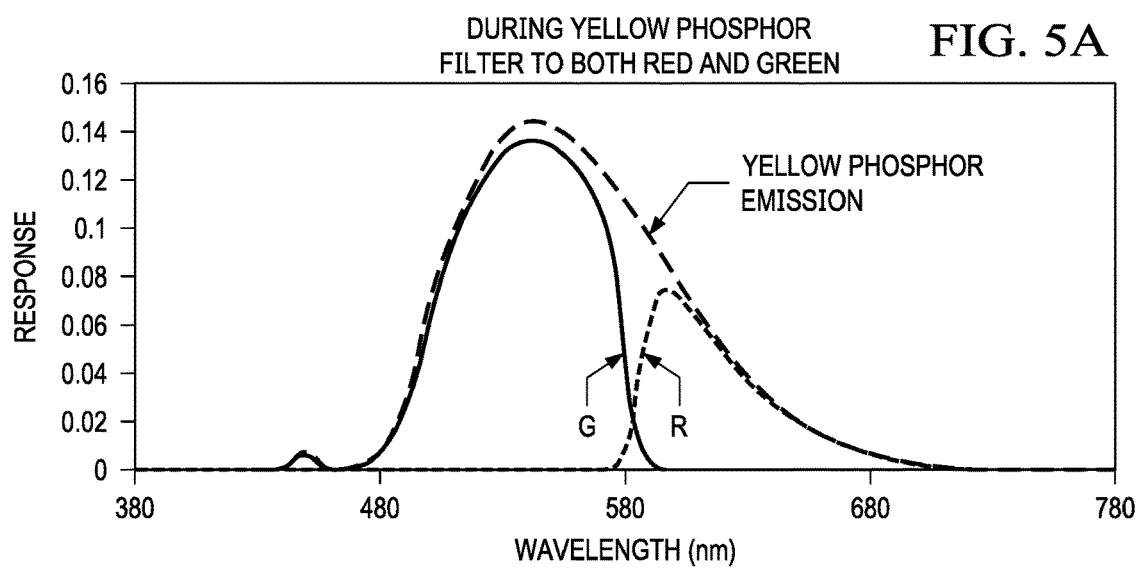
FIGS. 5A and 5B (collectively "FIG. 5") illustrate phosphor emission spectra.
Figure 5B:
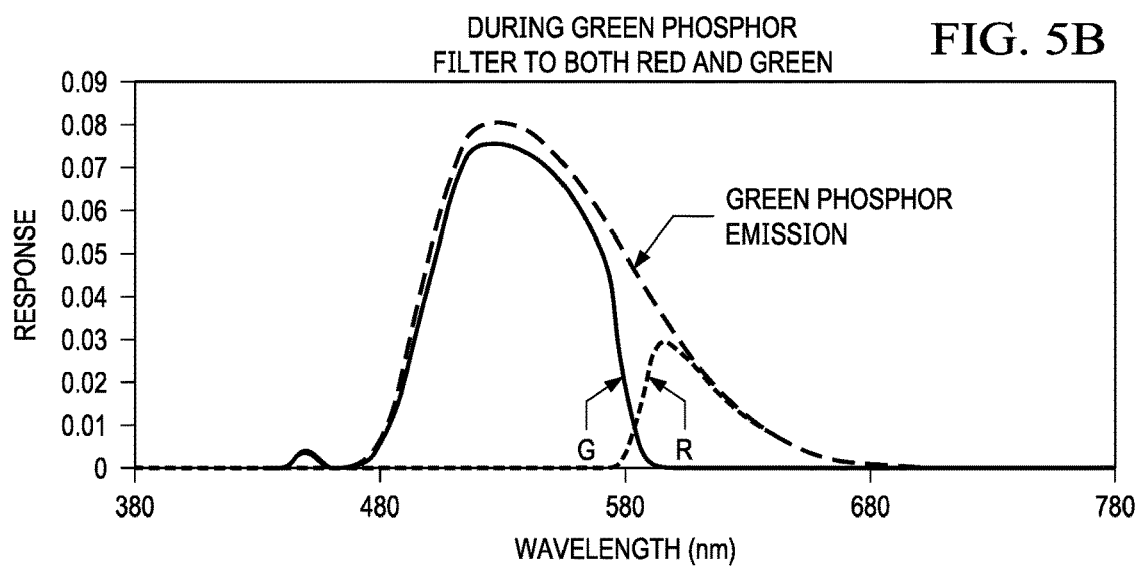
Figure 6:
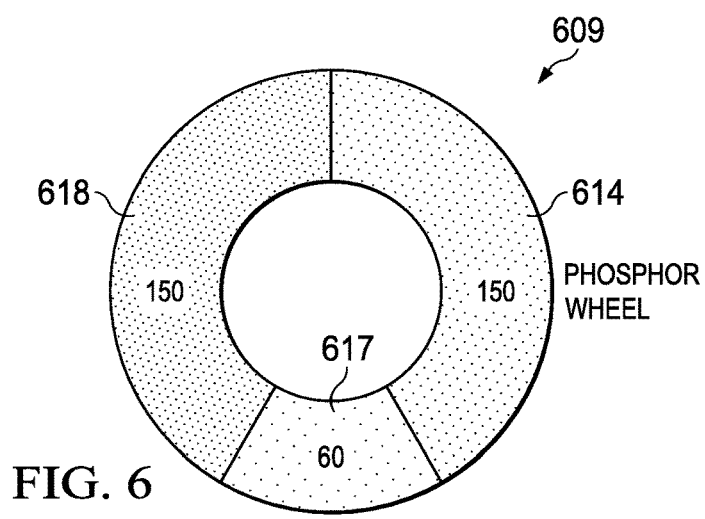
FIG. 6 illustrates an example configuration of a phosphor wheel.

FIG. 6 illustrates an example configuration of a wheel 609 using coatings of yellow phosphors 618 and green phosphors 614 (that have emission spectra like those shown in FIGS. 5A, 5B) on a light reflecting surface of an aluminum wheel. The yellow phosphor 618 and green phosphor 614 each occupy a 150° portion of a circular band, and an uncoated region 617 occupies the remaining 60° portion. Accordingly, the light reflecting surface is exposed in uncoated region 617. The wheel 609 may be rotated an integer 1 or greater number of rotations per available frame imaging time.

Figure 7:
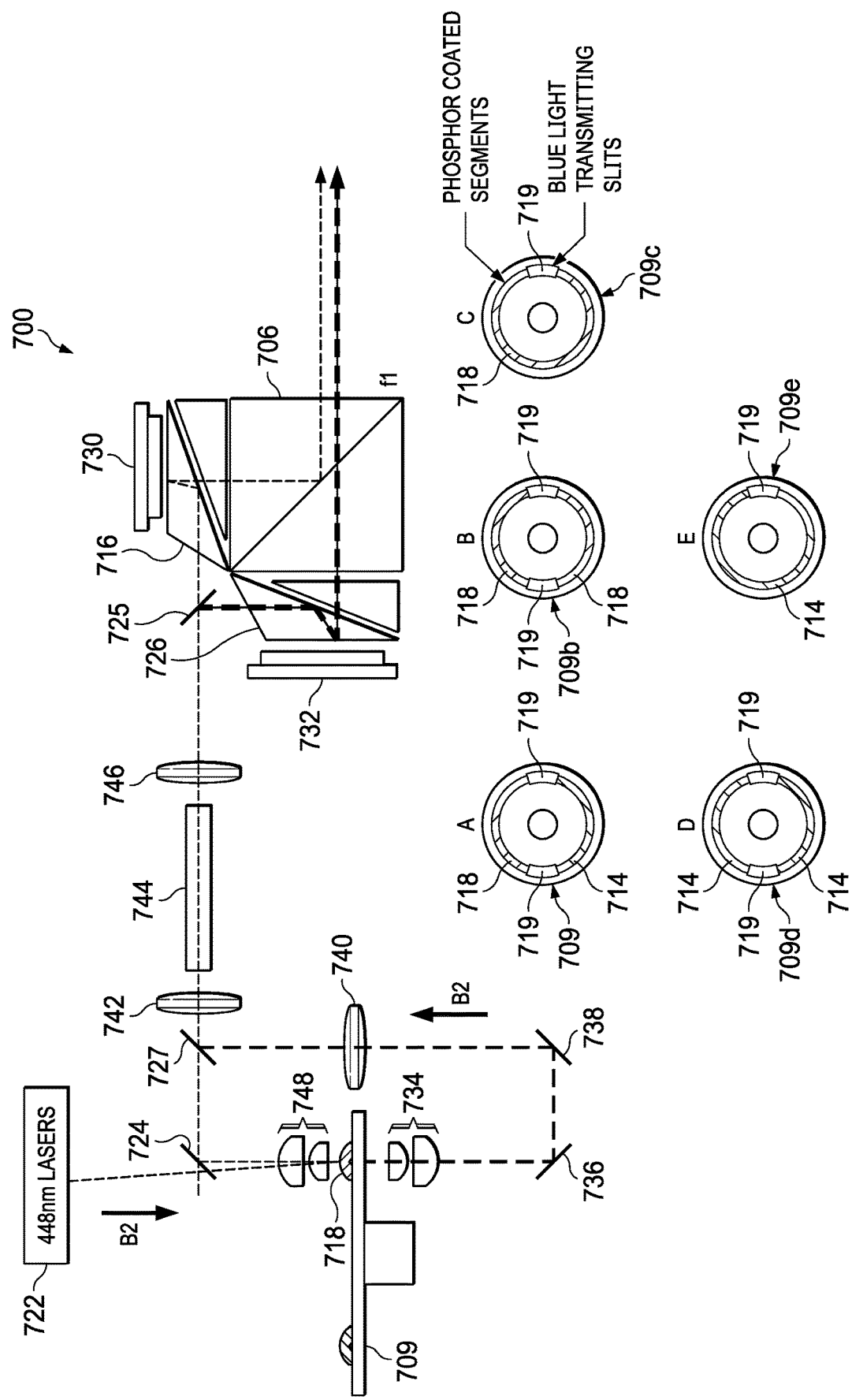
FIG. 7 illustrates another example architecture.

FIG. 7 illustrates another example architecture 700. In this example, the phosphor wheel 709 has blue light transmitting slits 719 in place of all or parts of the blue light reflecting surface 417 (FIG. 4) interrupting the phosphor ring segments (View A in FIG. 7). In this example, the red and green light phosphor emissions R, G may be the same as described for the example of FIG. 4. However, the wheel 709 transmits at least a part of the blue laser light B2 onto a separate path through lenses 734, off mirror 736, off mirror 738, through lens 740, off filter 727, through lens 742, through light tunnel 744, through lens 746, off filter 725, through TIR prism 726 and to the second DMD 732. In this example architecture 700, at least a portion of the blue laser light B2 emitted by laser light source 722 passes through a light transmitting slit 719 of the phosphor wheel 709 as the wheel rotates. For example, the light transmitting slit 719 may be one or more arcuate slits or blue light transmitting windows added in the position or positions of the blue light reflecting surface 417 described hereinabove in the example of FIG. 4. When light from the laser source 722 passes through filter 724, through lenses 748 to a light transmitting slit 719 of the rotating wheel 709, at least a part of that light will pass through the wheel and be directed (such as by reflecting optics) along the separate path (which may include an additional filter 727 and some common elements with the red and or green emitted light relaying paths) to the second DMD 732, for timing sequential modulation with the green color light. Optionally, the transmitting slit 719 may be integrated with phosphor segment portions, so green and blue light may be modulated together for at least portions of the frame modulation cycles. As with the example of FIG. 4, filter 725 transmits red light through TIR prism 716 to DMD 730, and combiner 706 combines the modulated light from DMD 730 and DMD 732 to provide combined light for the image on the target surface. Views B-E in FIG. 7 illustrate some of the other configurations 709b-e usable for the phosphor wheel 709, with the configuration of phosphor segments 714 and 718 corresponding to the configuration of phosphor segments 414, 418 shown in Views B-E in FIG. 4. However, blue light transmitting slits 719 are located at positions that were shown in FIG. 4 as positions for blue light reflecting surface 417 (FIG. 4). The slots may include optical diffusion elements (not shown) to diffuse the transmitted blue light.

Figure 8:
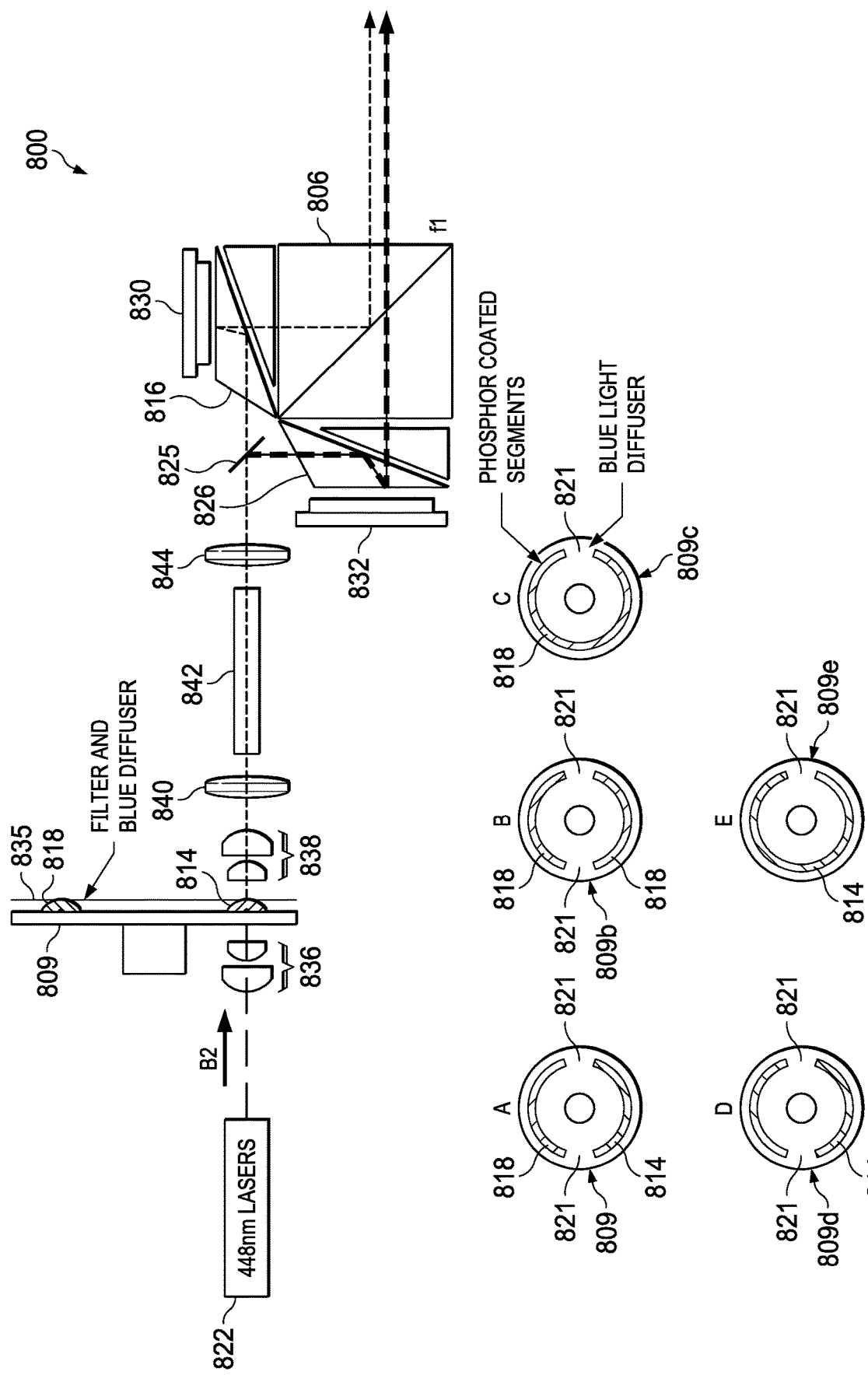
FIG. 8 illustrates another example architecture.

FIG. 8 illustrates another example architecture 800. In this example, a transmissive phosphor wheel 809 generates all colors. Also, in this example, the wheel 809 may be a light transmissive material, either entirely or at least for a part of the wheel. The phosphor material is on one surface of the wheel 809 and excited by laser light directed at an opposite surface of the wheel. For example, the wheel 809 may include a light transmissive band having a first angular yellow light segment 818 covered by yellow light producing phosphors, a second angular green light segment 814 covered by green light producing phosphors, and one or more third angular extents of uncoated segments 821 to provide for blue laser light transmission (View A in FIG. 8). As the wheel 809 turns, blue laser light B2 (directed at the uncovered back surface from laser light source 822) will pass through lenses 836 and wheel 809, and either strike one of the yellow phosphor segment 818 or the green phosphor segment 814, or pass through an uncoated segment 821. For spectra as illustrated in FIGS. 5A and 5B, light striking the yellow or green phosphor will emit red and green light. The phosphor emitted red light passes through lenses 838, lens 840, light tunnel 842, lens 844 and filter 825 to the first TIR prism 816, which provides the red light to DMD 830 for single color modulation. The phosphor emitted green light and the source directly transmitted blue light pass through lenses 838, lens 840, light tunnel 842 and lens 844, and then off filter 825 to the second TIR prism 826, which provides the green or blue light to DMD 832 for time sequenced modulation. Combiner 806 combines the modulated light from DMD 830 and DMD 832. The wheel 809 may accommodate both filter and diffuser elements 835. Other example wheel configurations 809b-e are shown in Views B-E of FIG. 8.

FIG. 9 illustrates a modification 900 of the example architecture 800 of FIG. 8 using a single filter to separate and combine colors. In this example, light source 922 with phosphor wheel 909 generates the red, green and blue colors through lenses 940 and 942, and through the same path from the phosphor wheel 909 through lens 934, light tunnel 936, lens 938, TIR prism structure 916 and color separating prism structure 906 to the DMDs 930, 932. TIR prism structure 916 directs the light at suitable angles into the color separating prism structure 906, with: (a) the red light directed to a first DMD 930 at one exit face by reflection off a centrally positioned angled dichroic filter 927 (f1); and (b) the green and blue light directed to a second DMD 932 at another exit face by transmission through the same dichroic filter 927. The modulated beams return along similar reflection and transmission paths and through the same TIR prism structure 916 to the projection lens (not shown) for display of the composite color image. As described hereinabove, red and green light may be generated by green and yellow phosphors 914, 918 having emission spectra like those shown in FIGS. 5A and 5B. The same principles are adaptable to reflective phosphor wheel arrangements, such as described hereinabove.

FIGS. 10-12 illustrate example arrangements 1000, 1100, 1200 in which an infrared (IR) light source is introduced into the projection system. As shown in FIG. 10, the IR light is introduced by a laser light source 1010 following at least a portion of the relay optics for modulation in a common and/or time sequenced manner with one or more of the other colors. Light source 1022 and phosphor 1018 generate red light that passes through lenses 1027 and reflects off filter 1024 through lens 1031, light tunnel 1033, lens 1034, filter 1025 and TIR prism 1016 to SLM 1030. Light source 1022 and phosphor 1018 also generate green light that passes through lenses 1027, reflects off filter 1024 through lens 1031, light tunnel 1033 and lens 1034, and reflects off filter 1025 through TIR prism 1026 to SLM 1032. Light source 1022 generates blue light by passing light through phosphor wheel 1009 and lenses 1036, which reflects off mirrors 1038, 1040 and 1042, and which passes through filter 1024, lens 1031, light tunnel 1033, lens 1034, and which reflects off filter 1025 through TIR prism 1026 to SLM 1032. Combiner 1006 combines the modulated light from SLMs 1030 and 1032, which passes to projection optics (not shown).

In FIGS. 11 and 12, IR laser light sources 1110, 1210, respectively, introduce IR light in a direction of the phosphor wheel generated light path at a blue input laser light transmitting filter 1124, 1224, respectively, positioned between a blue laser light source 1122, 1222, respectively, and the phosphor wheel 1109, 1209, respectively. In an example arrangement 1100, light source 1122 and phosphors 1114 and 1118 generate red light that passes through lenses 1127 and reflects off filter 1124 through lens 1131, light tunnel 1133, lens 1134, filter 1125 and TIR prism 1116 to SLM 1130. Light source 1122 and phosphors 1114 and 1118 also generate green light that passes through lenses 1127 and reflects off filter 1124 through lens 1131, light tunnel 1133 and lens 1134, and reflects off filter 1125 through TIR prism 1126 to SLM 1132. Light source 1122 generates blue light that reflects off phosphor wheel 1109 through lenses 1127, reflects off filter 1124 through lens 1131, light tunnel 1133 and lens 1134, and reflects off filter 1125 through TIR prism 1126 to SLM 1132. Combiner 1106 combines the modulated light from SLMs 1130 and 1132, which passes to projection optics (not shown).

In the example arrangement 1200, light source 1222 with phosphor wheel 1209 generates red, green and blue light. Light source 1222 generates blue light that passes through polarization filter 1224, quarter (¼) wave plate 1225 and lenses 1228 to phosphor wheel 1209. The colored light from the phosphors (or the reflection off phosphor wheel 1209) passes through lenses 1228 and quarter (¼) wave plate 1225, and reflects off polarization filter 1224 through lens 1230, and reflects off mirror 1232 through lens 1234 and a color wheel (integrated in phosphor wheel 1209) to integration tunnel 1236, from which the light passes to modulation and projection optics (not shown).

For example, the introduced IR light may be useful in simulation venues that need an IR source imaging capability. A red laser can also be added for red boost in certain applications. The same principles are applicable to the introduction of other light, such as in the ultraviolet (UV) or another non-visible region of the electromagnetic spectrum.

The modulation or projection is not limited to red, green and blue primary colors in any of the examples described herein, and the same principles are readily applicable to other choices of principal or secondary colors.

An example implementation of the two-chip architecture has a single bank of lasers to produce the red, green and blue light. In the arrangements, the lasers create the phosphor light output, and then this light divides into red and green components. During the blue time, the blue light passes through to the first (or second) DMD, and mirrors of the second DMD are in the off state during this time. The efficiency increases, because all the light is generated by only one bank of lasers.

Figure 13:
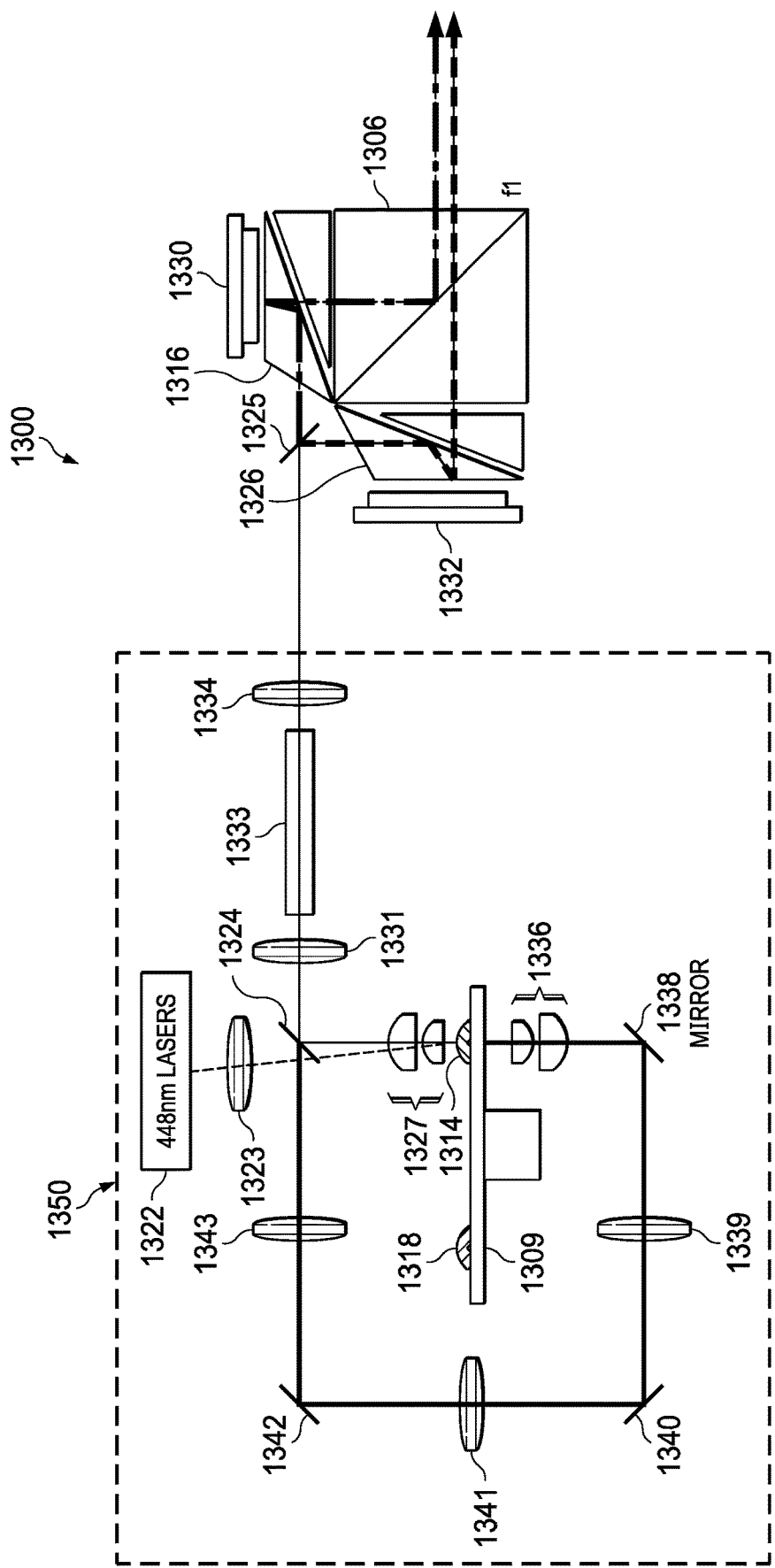
FIG. 13 is another example architecture.

FIG. 13 shows one suitable architecture 1300, which is like the example architecture 700 described hereinabove with reference to FIG. 7. This system design uses a single laser bank as light source 1322. The light generated by the phosphor 1314 or 1318 (or reflected off phosphor wheel 1309) passes through lenses 1327 to the first filter 1324. Light source 1322 and phosphor 1314 generate red light that passes through lenses 1327 and reflects off filter 1324 through lens 1331, light tunnel 1333, lens 1334, filter 1325 and TIR prism 1316 to SLM 1330. Light source 1322 and phosphor 1314 also generate green light that passes through lenses 1327, and reflects off filter 1324 through lens 1331, light tunnel 1333 and lens 1334, and reflects off filter 1325 through TIR prism 1326 to SLM 1332. Light source 1322 generates blue light that passes through lens 1323, phosphor wheel 1309 and lenses 1336, and reflects off mirror 1338 through lens 1339, and reflects off mirror 1340 through lens 1341, and reflects off mirror 1342 through lens 1343, filter 1324, lens 1331, light tunnel 1333 and lens 1334, and reflects off filter 1325 through TIR prism 1326 to SLM 1332. In this example, the red light splits off to the first SLM 1330, and the green light passes to the second SLM 1332. When the blue light exists, it is sent to the second SLM 1332. (Note: in an alternative arrangement, SLM 1330 could also receive the blue light with a filter change). SLMs 1330 and 1332 individually modulate the two light paths. The color cube combiner 1306 then recombines the "ON"-state light. In the architecture 1300 shown in FIG. 13, filter 1325 transmits the red light, but could also reflect the red light with a filter change. A similar arrangement is applicable to the green/blue channel. Accordingly, filter 1325 may be a short wavelength pass filter that transmits blue and green light and reflects red light. With this arrangement, the dominant color (in this example, red) is up to three times brighter than in a comparable single modulator system, because separate modulation of that color enables its projection for the complete frame (instead of for only one-third of the frame if modulated with a shared modulator). The other two colors (in this example, green and blue) will be 50% (i.e., one and one-half times) brighter than in a single-chip arrangement, because they project for one-half the frame instead of one-third of the frame, so only two colors share a modulator (instead of three colors sharing a modulator). The selection of red as the dominant color is not a requirement; however, the color chosen for modulation by the unshared (first) DMD will normally be the color that needs a greatest amount of boost. The attenuation applied to the dominant color path can be suitable controlled to boost the red output relative to the green and blue to obtain a proper color balance point. Where the white light source is uniformly color balanced, attenuation of the dominant (red) color path by 50% will produce a uniform color balance with a total projected lumen output 50% higher than a comparable single modulator system.

A second type of architecture modifies the light source 1350 before the filter 1325. For example, the illumination module may be changed to use a transmissive phosphor wheel, in an arrangement such as described hereinabove with reference to FIG. 8.

The wheel may use either a single phosphor or two phosphors (along with blue reflection or transmission segments), with spectra from a yellow and green phosphor being split into their two components of green and red. For example, a system using a single yellow phosphor may produce a good white point and enable a good red to be selected using a prism, but the green may suffer, giving a color point just inside the ITU-R Recommendation BT.709 green color point. If a single green phosphor is used, then the green point may be good (outside Rec. 709), but the white point may be poor (very cyan white point). An approach that uses both green and yellow phosphors will produce two greens and two reds, but identical sequences can be created for both colors, thereby enabling: a blend of the two greens to achieve a single green; and a blend of the two reds to achieve a single red.

In example illumination architectures, an optical path has a blue reject filter for light (from the phosphor) that is sent to the green SLM, but blue light is allowed to pass (via a blue bypass path) during the blue time. For an architecture with the blue bypass (such as shown in FIG. 13), the filter 1324 rejects the blue light for the green and yellow phosphor. For a transmissive phosphor system, a filter can be added at the output of the phosphor wheel for the phosphor sections, and a diffuser can be used for the blue section.

Figure 14:
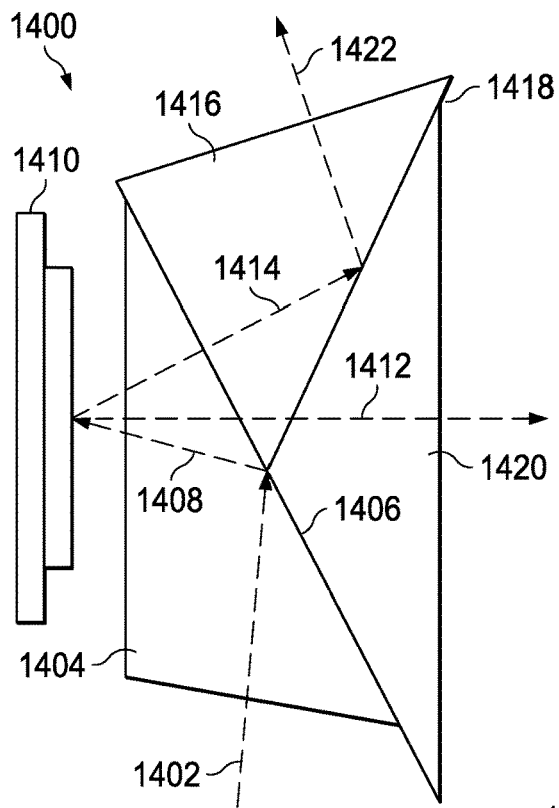
FIG. 14 is an illustration of an example modulation module having a three-part total-internal-reflection (TIR) prism and digital micromirror device (DMD).

FIGS. 14-21 illustrate examples of additional architectures having two SLMs for combining separately modulated colors. FIG. 14 shows an example modulation module 1400, which combines the illumination from a light source with the modulation of the projection beam. In this example, the light 1402 is directed to the SLM 1410 by total internal reflection (TIR). Light 1402 enters prism 1404 and has an angle of incidence at the prism-air interface between prism 1404 and air gap 1406. In this example, the prisms are glass, but plastics and other suitable materials may be used instead. Because the angle of incidence of light 1402 on the prism-air interface is greater than the critical angle, light 1402 reflects as light 1408 onto SLM 1410. Each pixel of SLM 1410 is in either an ON state or OFF state. ON state light reflects at one angle as light 1412. OFF state light reflects at another angle as light 1414. In this example, light 1412 traverses six prism-air interfaces, which are: between prism 1404 and air gap 1406; between air gap 1406 and prism 1416; between prism 1416 and air gap 1418; between air gap 1418 and prism 1420; and between prism 1420 and the air. Because light 1412 has an angle of incidence at each of these prism-air interfaces at less than the critical angle of these barriers, light 1412 passes through as shown in FIG. 14. Light 1412 is the desired modulated light used to create the image. Light 1414 has an angle of incidence at the prism-air interface between prism 1416 and air gap 1418 at an angle greater than the critical angle. Thus, light 1414 reflects as light 1422. In some examples, light 1422 enters a light trap (not shown) to absorb this waste light. Accordingly, modulation module 1400 receives light 1402 and provides light 1412 modulated by SLM 1410. This is a three-piece TIR prism, which directs light in the OFF state into a path that is different from a path of light in the ON state.

Figure 15:
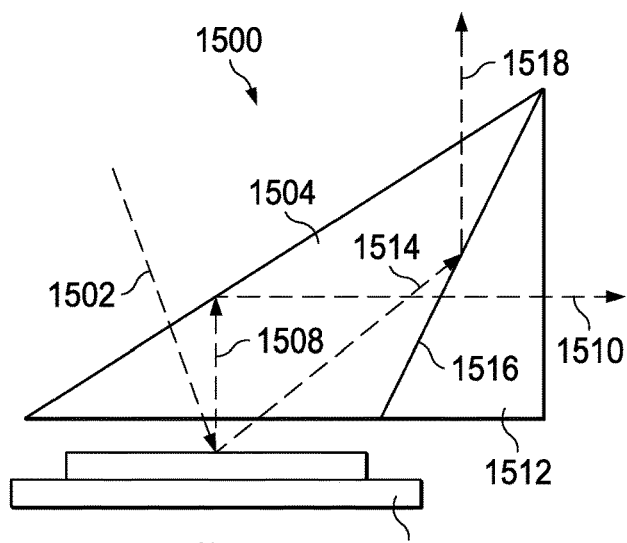
FIG. 15 is an illustration of another example modulation module having a two-part reverse TIR (RTIR) prism and DMD.

FIG. 15 shows another example modulation module 1500. Light 1502 passes through prism 1504 to SLM 1506. ON state light from SLM 1506 reflects as light 1508, which reflects as light 1510. Light 1510 passes through prism 1512 as shown in FIG. 15 to provide the desired modulated light. OFF state light 1514 reflects off the prism-air interface (between prism 1504 and air gap 1516) as light 1518. In some examples, light 1516 enters a light trap (not shown) to absorb this waste light. Because the ON state light reflects by total internal reflection after modulation, the arrangement of FIG. 15 is sometimes called a reverse total internal reflection (RTIR) modulation module.

Figure 16:
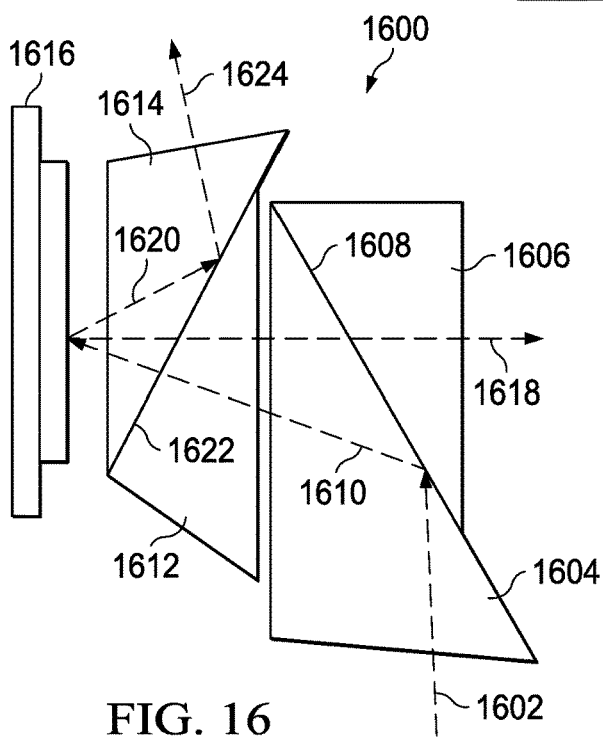
FIG. 16 is an illustration of another example modulation module having a four-part TIR prism and DMD.
Figure 17:
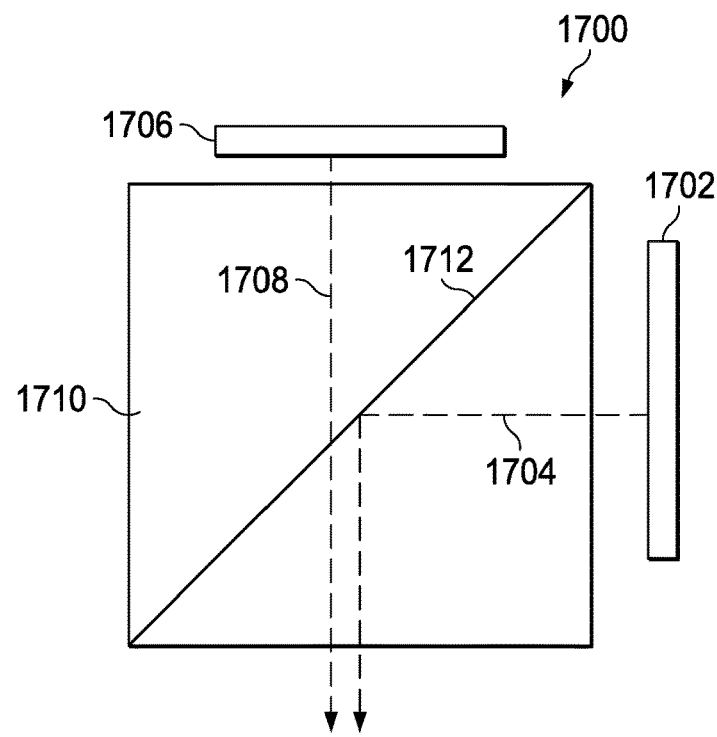
FIG. 17 is an illustration of an example combiner cube with two spatial light modulators (SLMs).

FIG. 16 shows another example modulation module 1600. Light 1602 reflects off the prism-air interface (between prism 1604 and air gap 1608) as light 1610. Light 1610 passes through prisms 1612 and 1614 to SLM 1616. ON state light 1618 from SLM 1616 passes through prisms 1614, 1612, 1604 and 1606 to provide the desired modulated light. OFF state light 1620 reflects off the prism-air interface (between prism 1614 and air gap 1622) as light 1624. In some examples, light 1624 enters a light trap (not shown) to absorb this waste light. Modulation module 1600 is useful in some applications, because the angle between prism 1604 and prism 1606 is selectable separately from the angle between prism 1612 and prism 1614. FIG. 16 is another prism arrangement that uses one prism near the DMD to direct light in the OFF state into a path that is different from a path of light in the ON state FIG. 17 shows an example combiner 1700. Modulation modules 1702 and 1706 provide modulated light to prism 1710. Prism 1710 includes dichroic filter 1712, which reflects the color of light 1704 but passes the color of light 1708. For example, light 1708 may be red light, and light 1704 may be blue or green light. In this example, dichroic filter 1712 is a long wavelength pass filter that passes the lower frequency red light and reflects the higher frequency green and blue light. The result is that light 1708 and 1704 combine and pass to projection optics (not shown in FIG. 17) for the desired image.

Figure 18:
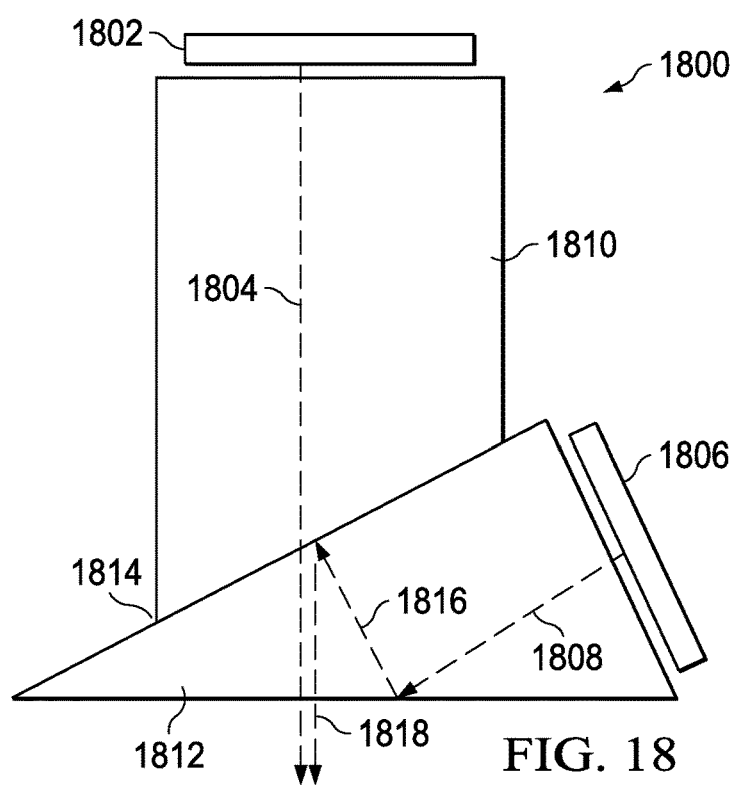
FIG. 18 is an illustration of an example Philips combiner with two SLMs.

FIG. 18 shows another example combiner 1800. Light 1808 from modulation module 1806 reflects by TIR as light 1816 and is again reflected by TIR off the prism-air interface (between prism 1812 and air gap 1814) as light 1818. Light 1804 from modulation module 1802 passes through prisms 1810 and 1812. The result is that light 1804 and light 1818 are combined and directed to projection optics (not shown in FIG. 18) for the desired image.

Figure 19A:
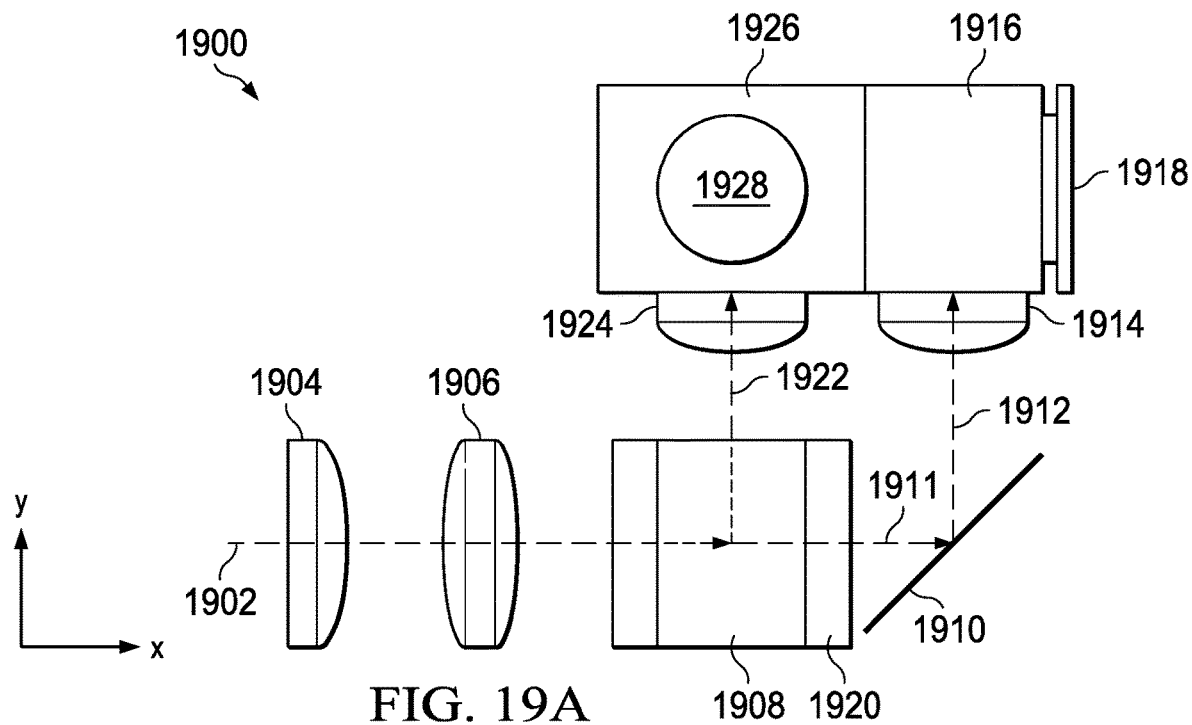
FIGS. 19A-C (collectively "FIG. 19") are illustrations of an example two-chip architecture having a three-part TIR with a combiner cube.
Figure 19B:
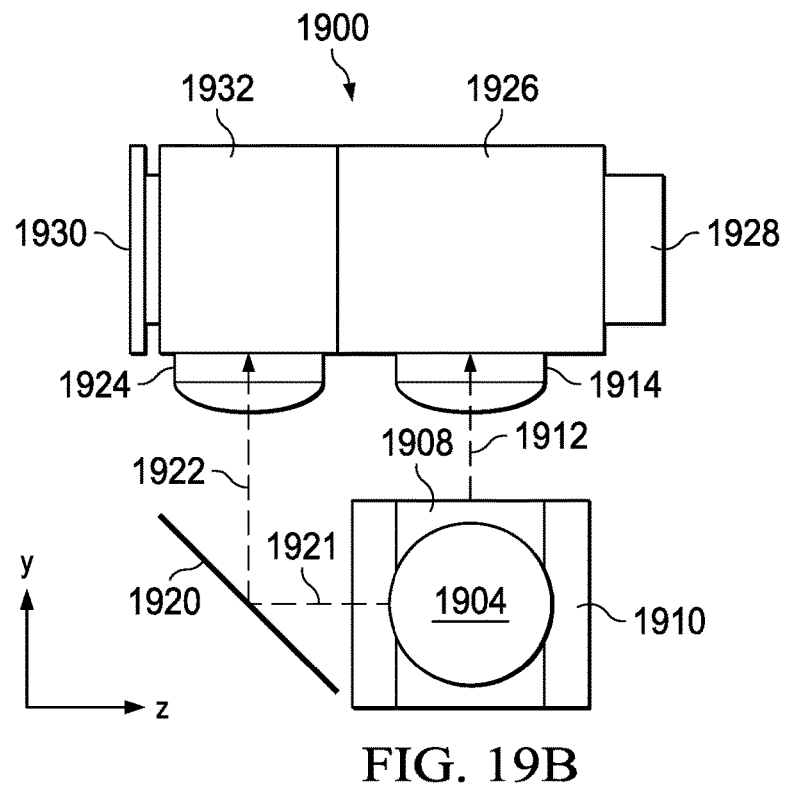
Figure 19C:
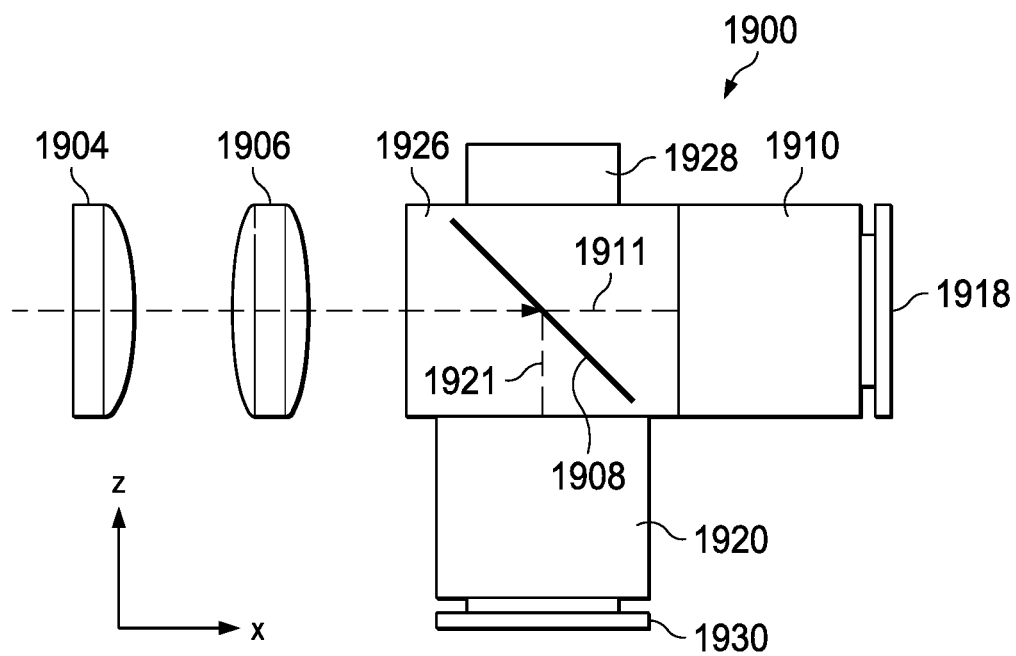

FIGS. 19A-C (collectively "FIG. 19") show an example architecture 1900 having modulation modules and combiners as described hereinabove in FIGS. 14-18. However, differing entry and exit angles for the modulation modules and/or combiners may require changing the relative positioning of components. FIG. 19A is a side view of architecture 1900. FIG. 19B is another side view (rotated 90 degrees around the y-axis of FIG. 19A) of architecture 1900 from a perspective of the entering light 1902. FIG. 19C is a bottom view (rotated 90 degrees around the x-axis of FIG. 19A) of architecture 1900. In this description (e.g., of FIGS. 19-21), the terms "top," "bottom" and "side" are only relative references (relative to one another) and do not refer to any other frame of reference. For example, even if the "top" in FIG. 19A is directed toward a ground, it would nevertheless remain the "top" in this description. Referring to FIG. 19A, light 1902 passes through lenses 1904 and 1906 to filter 1908. In this example, filter 1908 is a long wavelength pass filter. Light 1902 is provided by a light source, such as the light source of FIG. 1A, or one of the light sources 150 (FIG. 1B), 200 (FIG. 2A), 250 (FIG. 2B) or 1350 (FIG. 13). As shown in FIG. 19C, filter 1908 has a 45 degree angle, so it reflects higher frequency light 1921 (in this example, blue and green) to mirror 1920. As shown in FIG. 19B, mirror 1920 reflects the higher frequency light 1921 through lens 1924 to modulation module 1932, which includes SLM 1930. As shown in FIG. 19A, red light from light 1902 passes through filter 1908 as light 1911 to mirror 1910, which reflects such light (as red light 1912) through lens 1914 into modulation module 1916, which includes SLM 1918. Lenses 1914 and 1924 are arranged to distribute the light more evenly across SLM 1918 and SLM 1930, respectively. Combiner 1926: combines the modulated light output of modulation modules 1916 and 1932; and passes the combined modulated light to projection optics 1928. However, architecture 1900 is not as compact as other examples described hereinbelow.

Figure 20A:
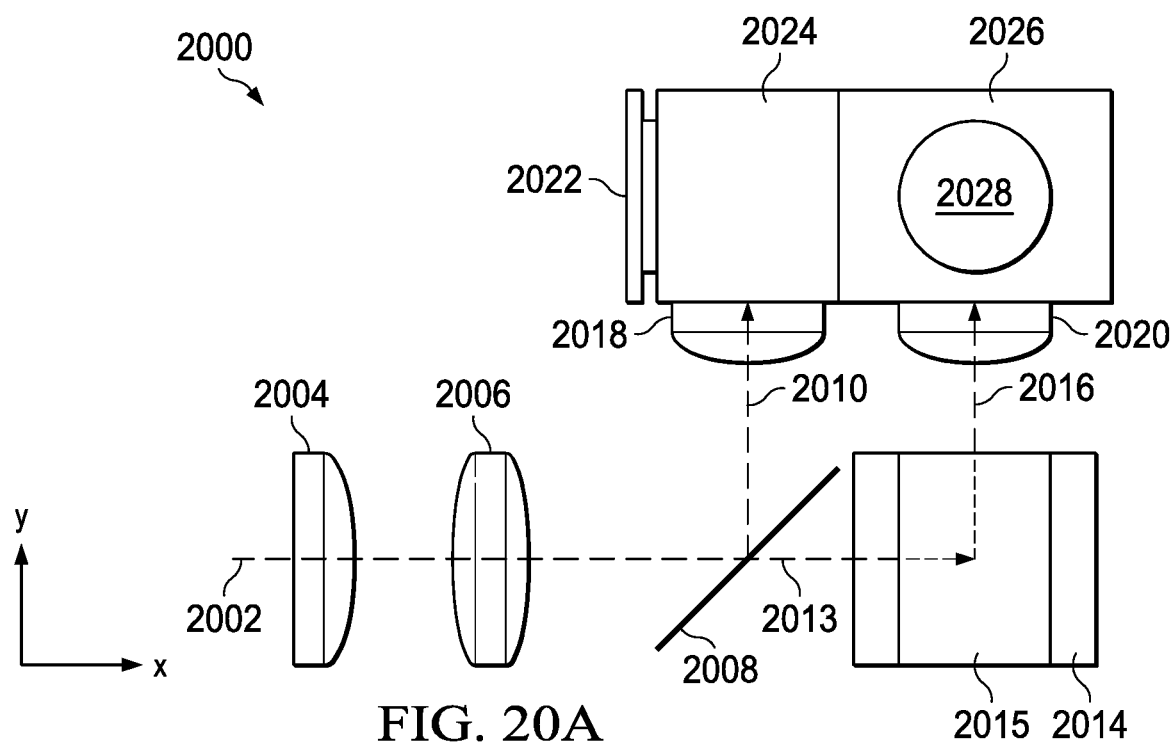
FIGS. 20A-C (collectively "FIG. 20") are illustrations of another example architecture.
Figure 20B:
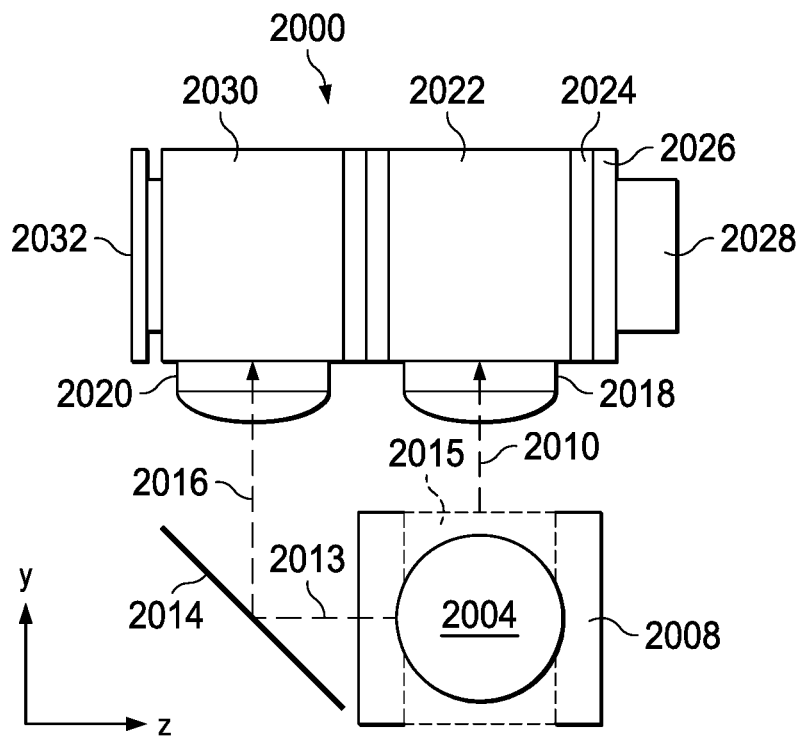
Figure 20C:
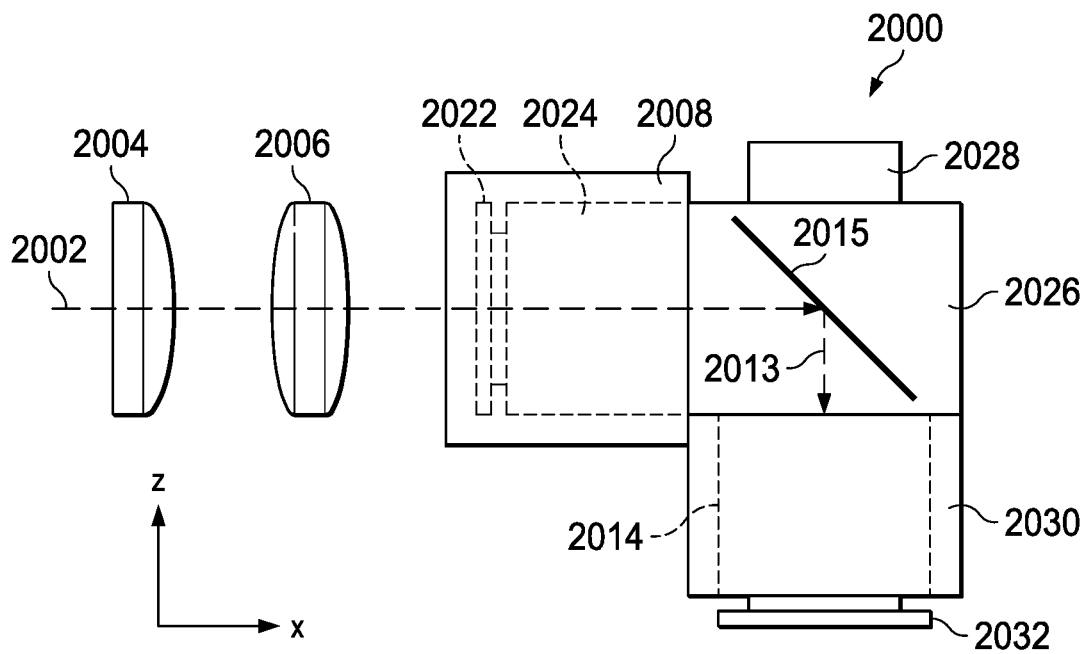

FIGS. 20A-C (collectively "FIG. 20") show another example architecture having modulation modules and combiners as described hereinabove in FIGS. 14-18. As with architecture 1900 (FIG. 19), differing entry and exit angles for the modulation modules and/or combiners may require changing the relative positioning of components. FIG. 20A is a side view of architecture 2000. FIG. 20B is another side view (rotated 90 degrees around the y-axis of FIG. 20A) of architecture 2000 from the perspective of the entering light 2002. FIG. 20C is a bottom view (rotated 90 degrees around the x-axis of FIG. 20A) of architecture 2000. Light 2002 is provided by a light source, such as the light source of FIG. 1A, or one of the light sources 150 (FIG. 1B), 200 (FIG. 2A), 250 (FIG. 2B) or 1350 (FIG. 13). As shown in FIG. 20A, light 2002 passes through lenses 2004 and 2006 to filter 2008. In this example, filter 2008 is a long wavelength pass filter. Filter 2008 has a 45 degree angle, so it reflects higher frequency light 2010 (in this example, blue and green) through lens 2018 into modulation module 2024, which includes SLM 2022. Red light from light 2002 passes through filter 2008 as light 2013 to mirror 2015 and mirror 2014. Referring also to FIG. 20B, mirror 2014 reflects such light (as red light 2016) through lens 2020 into modulation module 2030, which includes SLM 2032. Lenses 2018 and 2020 are arranged to distribute the light more evenly across SLM 2022 and SLM 2032, respectively. Combiner 2026: combines the modulated light output of modulation modules 2024 and 2030; and passes the combined modulated light to projection optics 2028.

Figure 21:
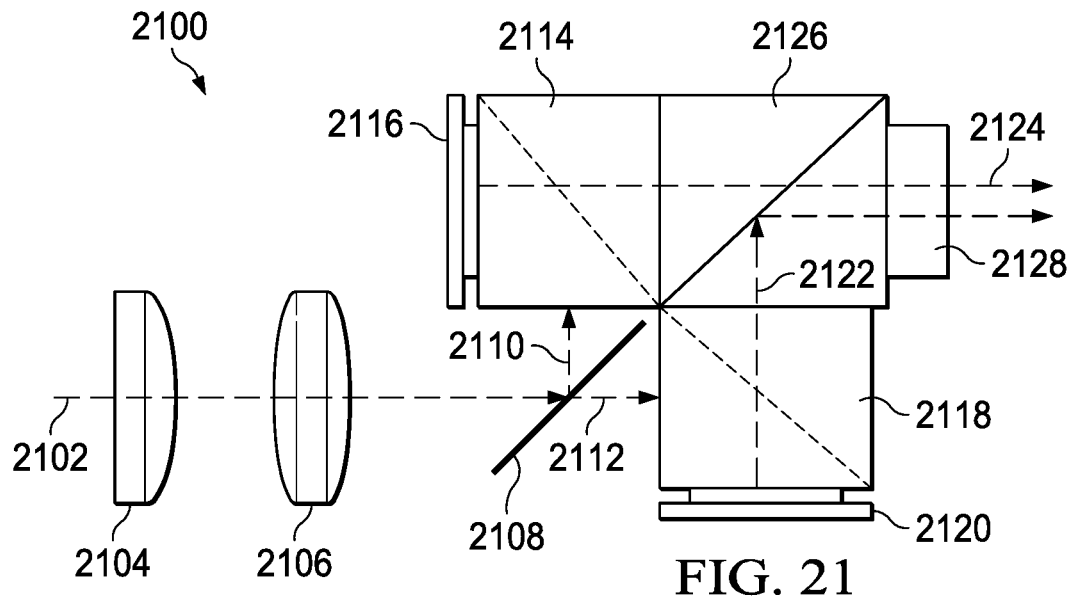
FIG. 21 is an illustration of another example architecture.

FIG. 21 shows another example architecture having modulation modules and combiners as described hereinabove in FIGS. 14-18. As with architectures 1900 (FIG. 19) and 2000 (FIG. 20), differing entry and exit angles for the modulation modules and/or combiners may require changing the relative positioning of components. In architecture 2100, light 2102 passes through lenses 2104 and 2106 to filter 2108. Light 2102 is provided by a light source, such as the light source of FIG. 1A, or one of the light sources 150 (FIG. 1B), 200 (FIG. 2A), 250 (FIG. 2B) or 1350 (FIG. 13). In this example, filter 2108 is a long wavelength pass filter. Filter 2108 reflects higher frequency light 2110 (in this example blue and green) into modulation module 2114, which includes SLM 2116. Lower frequency light 2112 (in this example red) passes through filter 2108 into modulation module 2118, which includes SLM 2120. Combiner 2126: combines modulated light 2124 and modulated light 2122; and passes the combined modulated light through projection optics 2128 to a target image plane. Higher frequency light 2110 and lower frequency light 2112 may also pass through additional lenses (not shown for clarity) to put the filter 2108 in telecentric light space, so the incoming light (when split) will have less color variation across SLMs 2116 and 2120. Architecture 2100 is very compact.

Figure 22:
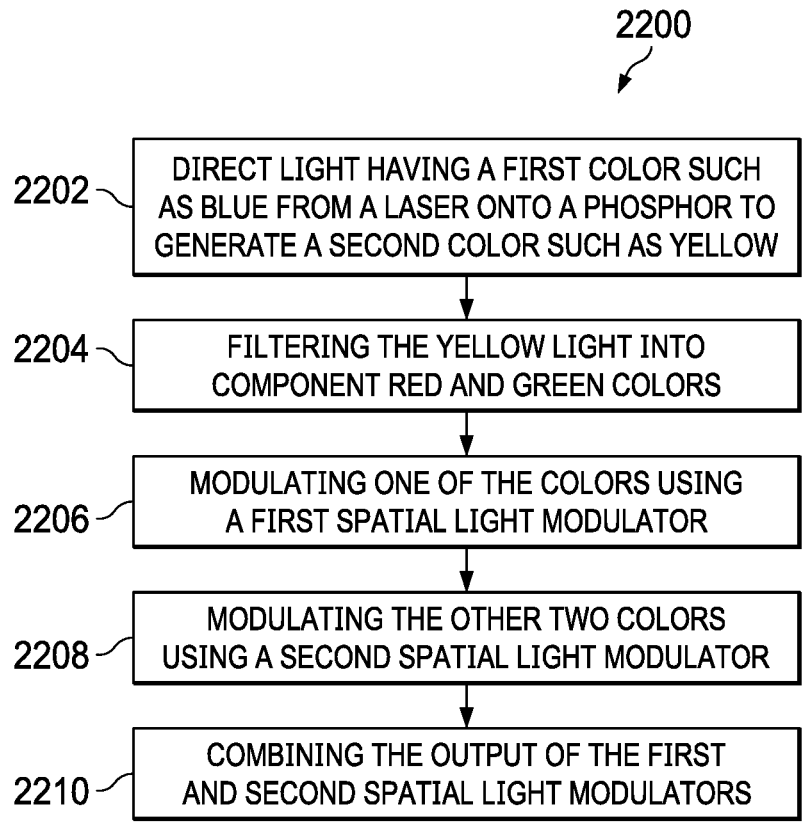
FIG. 22 is a flow diagram of an example method.

FIG. 22 is a flow diagram of an example method 2200. Method 2200 begins at step 2202, which directs light of a first color onto a phosphor that generates light of a second color. In at least one example, the first color is blue, and the second color is yellow. The first color light may be selectively applied to the phosphor, such as using one of the arrangements of FIGS. 1A-1B and 2A-2B. At step 2204, the yellow light emitted by the phosphor (the second color light) is filtered to produce the third and fourth colors, such as green and red. At step 2206, the light of one of the colors (such as green) is modulated by a first spatial light modulator, such as a DMD of FIG. 1A. At step 2208, the other two colors (such as red and blue) are alternately modulated by a second spatial light modulator as described hereinabove with respect to FIG. 1A. Step 2210 combines the output of the two modulators.

Figure 23:
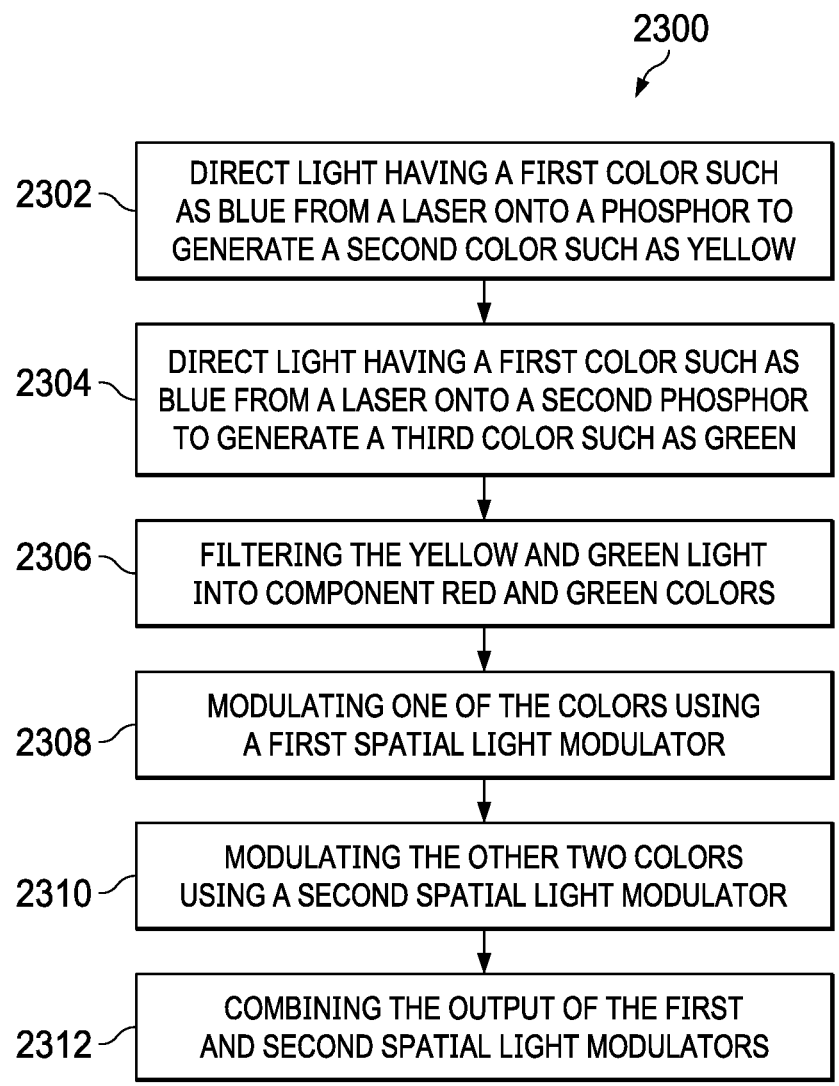
FIG. 23 is a flow diagram of another example method.

FIG. 23 is a flow diagram of another example method 2300. Method 2300 begins at step 2302, which directs light of a first color onto a phosphor that generates light of a second color. In at least one example, the first color is blue, and the second color is yellow. The first color light may be selectively applied to the phosphor, such as using a phosphor wheel. For example, step 2304 directs the first color light onto a second phosphor to produce a third color (such as green). At step 2306, the light from the phosphors is filtered into component colors, such as red and green. At step 2308, the light of one of the colors (such as green) is modulated by a first spatial light modulator, such as a DMD. At step 2310, the other two colors (such as red and blue) are alternately modulated by a second spatial light modulator as described hereinabove. Step 2312 combines the output of the two modulators for projection.

Modifications are possible in the described examples, and other examples are possible, within the scope of the claims.

What is claimed is:

1. A system comprising:
    a first light source configured to produce first light having a first color;
    a second light source configured to produce second light having the first color;
    a third light source configured to produce third light having the first color, wherein the system is configured to alternately:
        illuminate the second light source and the third light source and not illuminate the first light source; and
        illuminate the first light source and not illuminate the second light source and the third light source;
    a filter optically coupled to the first light source and to the second light source, the filter configured to reflect the first light having the first color and the second light having the first color; and
    a phosphor element having a first side and a second side, the first side optically coupled to the third light source and the second side optically coupled to the filter, the phosphor element configured to:
        produce fourth light having a second color and a third color responsive to receiving the third light at the first side; and
        produce fifth light having the second color and the third color responsive to receiving the second light at the second side; and
    wherein the filter is configured to:
        transmit the fourth light having the second color and the third color; and
        transmit the fifth light having the second color and the third color.

2. The system of claim 1, wherein the phosphor element is a stationary phosphor.

3. The system of claim 2, wherein the third light source is adjacent to the stationary phosphor.

4. The system of claim 1, wherein the phosphor element is a transmissive phosphor wheel.

5. The system of claim 4, wherein the filter is a first filter, and the transmissive phosphor wheel comprises a second filter on the first side, wherein the second filter is configured to transmit the third light having the first color, reflect the fourth light having the second color, reflect the fourth light having the third color, reflect the fifth light having the second color, and reflect the fifth light having the third color.

6. The system of claim 1, wherein the second light source is configured to pump the second side of the phosphor element and the third light source is configured to pump the first side of the phosphor element.

7. The system of claim 1, wherein the first light source, the second light source, and the third light source are blue laser diodes.

8. The system of claim 1, wherein the first color is blue, the second color is red, and the third color is green.

9. The system of claim 1, further comprising a dichroic mirror optically coupled to the filter, the dichroic mirror configured to:
 transmit the first light having the first color;
 transmit a portion of the fourth light having the second color;
 reflect a portion of the fourth light having the third color;
 transmit a portion of the fifth light having the second color; and
 reflect a portion of the fifth light having the third color.

10. A system comprising:
 a first light source configured to produce first light having a first color;
 a second light source configured to produce second light having the first color;
 a third light source configured to produce third light having the first color, wherein the system is configured to alternately:
  illuminate the second light source and the third light source and not illuminate the first light source; and
  illuminate the first light source and not illuminate the second light source and the third light source;
 a filter optically coupled to the first light source and to the second light source, the filter configured to reflect the first light having the first color and the second light having the first color;
 a phosphor element having a first side and a second side, the first side optically coupled to the third light source and the second side optically coupled to the filter, the phosphor element configured to: produce fourth light having a second color and a third color responsive to receiving the third light at the first side; and produce fifth light having the second color and the third color responsive to receiving the second light at the second side;
 the filter configured to transmit the fourth light having the second color and the third color and transmit the fifth light having the second color and the third color, the system further comprising:
 a first spatial light modulator;
 a second spatial light modulator; and
 a dichroic mirror optically coupled to the filter, to the first spatial light modulator, and to the second spatial light modulator, the dichroic mirror configured to:
  direct the first light having the first color to the first spatial light modulator;
  direct a first portion of the fourth light having the second color to the first spatial light modulator;
  direct a second portion of the fourth light having the third color to the second spatial light modulator;
  direct a first portion of the fifth light having the second color to the first spatial light modulator; and
   direct a second portion of the fifth light having the third color to the second spatial light modulator.

11. The system of claim 10, further comprising:
 a first prism assembly optically coupled to the dichroic mirror and to the first spatial light modulator;
 a second prism assembly optically coupled to the dichroic mirror and to the second spatial light modulator; and
 a combiner optically coupled to the first prism assembly and to the second prism assembly.

12. The system of claim 11, wherein the combiner comprises a prism comprising a dichroic layer.

13. The system of claim 11, wherein the combiner comprises:
 a first prism; and
 a second prism, an air layer between the second prism and the first prism.

14. The system of claim 11, wherein the first prism assembly is a first three-piece total internal reflection (TIR) prism and the second prism assembly is a second three-piece TIR prism.

15. The system of claim 11, wherein the first prism assembly is a first reverse total internal reflection (RTIR) prism and the second prism assembly is a second RTIR prism.

16. The system of claim 11, wherein the first prism assembly comprises:
 a first prism;
 a second prism optically coupled to the first prism, a first air gap between the second prism and the first prism;
 a third prism optically coupled to the second prism; and
 a fourth prism optically coupled to the third prism, a second air gap between the fourth prism and the third prism.

17. The system of claim 10, wherein the phosphor element is a stationary phosphor.

18. The system of claim 17, wherein the third light source is adjacent to the stationary phosphor.

19. The system of claim 10, wherein the phosphor element is a transmissive phosphor wheel.

20. The system of claim 19, wherein the filter is a first filter, and the transmissive phosphor wheel comprises a second filter on the first side, wherein the second filter is configured to transmit the third light having the first color, reflect the fourth light having the second color, reflect the fourth light having the third color, reflect the fifth light having the second color, and reflect the fifth light having the third color.

21. The system of claim 10, wherein the second light source is configured to pump the second side of the phosphor element and the third light source is configured to pump the first side of the phosphor element.

22. The system of claim 10, wherein the first light source is configured to produce the first light during a first time period, the second light source is configured to produce the second light during a second time period, and the third light source is configured to produce the third light during the second time period.

23. A method comprising:
 alternately producing, by a first light source, first light having a first color and producing, by a second light source, second light having the first color;
 producing, by a third light source, third light having the first color, while the second light source produces the first light;
 reflecting, by a filter, the first light having the first color and the second light having the first color;
 producing, by a phosphor element, fourth light having a second color and a third color responsive to receiving the third light at a first side of the phosphor element;
 producing, by the phosphor element, fifth light having the second color and the third color responsive to receiving the second light at a second side of the phosphor element;
 transmitting, by the filter, the fourth light having the second color and the third color; and transmitting, by the filter, the fifth light having the second color and the third color.

24. The method of claim 23, wherein the phosphor element is a stationary phosphor.

25. The method of claim 24, wherein the third light source is adjacent to the stationary phosphor.

26. The method of claim 23, wherein the phosphor element is a transmissive phosphor wheel.

27. The method of claim 26, wherein the filter is a first filter, and the transmissive phosphor wheel comprises a second filter on the first side, the method further comprising:

transmitting, by the second filter, the third light having the first color;

reflecting, by the second filter, the fourth light having the second color;

reflecting, by the second filter, the fourth light having the third color;

reflecting, by the second filter, the fifth light having the second color; and reflecting, by the second filter, the fifth light having the third color.

28. The method of claim 23, further comprising:

pumping, by the second light source, the second side of the phosphor element; and pumping, by the third light source, the first side of the phosphor element.

29. The system of claim 1, wherein the third light source is attached to the phosphor element.

\* \* \* \* \*